(12) United States Patent
Tsou et al.

(10) Patent No.: US 8,960,250 B2
(45) Date of Patent: Feb. 24, 2015

(54) LOW MOISTURE PERMEABILITY LAMINATE CONSTRUCTION

(75) Inventors: Andy Haishung Tsou, Houston, TX (US); Stephan Bertil Ohlsson, Haacht (BE); Yoshihiro Soeda, Hiratsuka (JP); Shusaku Tomoi, Hiratsuka (JP); Yuichi Hara, Hiratsuka (JP)

(73) Assignees: The Yokohama Rubber Co., Ltd., Tokyo (JP); ExxonMobil Chemical Patents Inc., Houston, TX (US)

( * ) Notice: Subject to any disclaimer, the term of this patent is extended or adjusted under 35 U.S.C. 154(b) by 977 days.

(21) Appl. No.: 12/446,877

(22) PCT Filed: Oct. 26, 2006

(86) PCT No.: PCT/US2006/060270
§ 371 (c)(1),
(2), (4) Date: Sep. 9, 2009

(87) PCT Pub. No.: WO2008/051253
PCT Pub. Date: May 2, 2008

(65) Prior Publication Data
US 2010/0024941 A1 Feb. 4, 2010

(51) Int. Cl.
*B60C 1/00* (2006.01)
(Continued)

(52) U.S. Cl.
CPC .............. *B60C 1/0008* (2013.01); *B32B 25/08* (2013.01);

(58) Field of Classification Search
CPC .......... B60C 1/0008; B60C 5/14; B32B 25/08
USPC .......................................... 152/510
See application file for complete search history.

(56) References Cited

U.S. PATENT DOCUMENTS 4,480,074 A 10/1984 Wang
(Continued)

FOREIGN PATENT DOCUMENTS

EP 0706878 4/1996
(Continued)

OTHER PUBLICATIONS

Liberman, R. and Stewart, C. 2004. Propylene Polymers. Encylclopedia of Polymer Science and Technology. pp. 297 and 303.*

*Primary Examiner* — Justin Fischer
*Assistant Examiner* — Philip N Schwartz
(74) *Attorney, Agent, or Firm* — Novak Druce Connolly Bove + Quigg LLP

(57) ABSTRACT

An article having a fluid permeation prevention layer, such as a pneumatic tire or hose. A tire for example includes an outer tread layer, intermediate sidewall and carcass layers and an innermost air permeation prevention layer: (i) the air permeation prevention (APP) layer having an upper and a lower surface, the layer having a polymer composition exhibiting an air permeation coefficient (APC) of about $25 \times 10^{12}$ cc cm/cm2 sec cmHg (at 30° C.) or less and a Young's modulus of about 1 MPa to about 500 MPa, the polymer composition comprising: (A) at least 10 wt % of at least one. thermoplastic resin component having an APC of about $25 \times 10^{12}$ cc cm/cm2 sec cmHg (at 30° C.) or less and a Young's modulus of more than 500 MPa, which is preferably a polyamide resin or mixture, and (B) at least 10 wt % of at least one elastomer component having an APC of more than about $25 \times 10^{12}$ cc cm/cm2 sec cmHg (at 30° C.) and a Young's modulus of not more than 500 MPa, which elastomer component is preferably a halogen-containing rubber or mixture, the total amount (A)+(B) being not less than about 30 wt %, and the elastomer component is a dispersed vulcanized, discontinuous phase in the thermoplastic resin matrix; and (ii) at least one thermoplastic laminate layer bonded to at least said lower surface of the APP layer, the thermoplastic layer comprising a film-forming, semi-crystalline, substantially hydrophobic carbon chain polymer having a glass transition temperature, Tg, of less than about –200 C.

6 Claims, 3 Drawing Sheets

(51) Int. Cl.
*B32B 25/08* (2006.01)
*B60C 5/14* (2006.01)

(52) U.S. Cl.
CPC ....................................... *B60C 5/14* (2013.01)
USPC ........ 152/510; 428/476.3; 428/483; 428/519; 428/521; 428/473.5; 428/447; 428/421; 428/500; 428/336; 428/36.91

(56) References Cited

U.S. PATENT DOCUMENTS

| | | | |
|---|---|---|---|
| 4,873,288 A | 10/1989 | Komatsu et al. |
| 5,073,597 A | 12/1991 | Puydak et al. |
| 5,157,081 A | 10/1992 | Puydak et al. |
| 5,738,158 A | 4/1998 | Ozawa et al. |
| 5,910,544 A | 6/1999 | Ozawa et al. |
| 5,992,486 A | 11/1999 | Katsuki et al. |
| 6,062,283 A | 5/2000 | Watanabe et al. |
| 6,079,465 A | 6/2000 | Takeyama et al. |
| 6,136,123 A | 10/2000 | Kaido et al. |
| 6,346,571 B1 | 2/2002 | Dharmarajan et al. |
| 6,402,867 B1 | 6/2002 | Kaido et al. |
| 6,538,066 B2 | 3/2003 | Watanabe et al. |
| 6,814,118 B2 | 11/2004 | Narahara et al. |

FOREIGN PATENT DOCUMENTS

| | | |
|---|---|---|
| EP | 0722850 | 7/1996 |
| EP | 0722850 B2 | 7/1996 |
| EP | 0857761 | 8/1998 |
| EP | 0857761 B1 | 8/1998 |
| EP | 0969039 A1 | 1/2000 |
| JP | 05169909 | 7/1993 |
| JP | 8-132553 | 5/1996 |
| JP | 8-217922 | 8/1996 |
| JP | 08-244402 A | 9/1996 |
| WO | WO-97/45489 A1 | 12/1997 |
| WO | WO-2004/081099 A1 | 9/2004 |
| WO | WO-2004/081106 A1 | 9/2004 |
| WO | WO-2004/081107 A1 | 9/2004 |
| WO | WO-2004/081108 A1 | 9/2004 |
| WO | WO-2004/081116 A1 | 9/2004 |

\* cited by examiner

LOW MOISTURE PERMEABILITY LAMINATE CONSTRUCTION

CROSS REFERENCE TO RELATED APPLICATIONS

This application is a National Stage of PCT/US2006/060270 filed Oct. 26, 2006, the entire contents of which are incorporated herein by reference.

FIELD OF THE INVENTION

The present invention relates to thermoplastic elastomer compositions particularly useful for tire and other industrial rubber applications and to processes for producing such compositions. Disclosed herein are compositions useful in multilayer or laminate constructions, for example in tire construction, especially an air and moisture impermeable layer within a tire carcass, often referred to as a tire innerliner. Alternatively, such a construction is useful in hose constructions, particularly the inner layer of such constructions. At least one of the layers comprises nylon and halogenated isobutylene-containing elastomer. In one aspect, the present invention relates to an improved thermoplastic elastomer composition having excellent heat resistance, durability and flexibility, while possessing superior air and moisture impermeability for applications in a tire innerliner and in a barrier layer. In particular, the present invention relates to a soft thermoplastic elastomer composition laminated to one or more thin hydrophobic flexible thermoplastic layers.

BACKGROUND OF THE INVENTION

EP722850B1 discloses a low-permeability thermoplastic elastomer composition that is superior as a gas-barrier layer in pneumatic tires. This thermoplastic elastomer composition comprises a low-permeability thermoplastic matrix, such as polyamide or a blend of polyamides, in which there is dispersed a low-permeability rubber, such as brominated poly(isobutylene-co-paramethylstyrene), referred to hereinafter as BIMS. In EP857761A1 and EP969039A1, the viscosity ratio of the thermoplastic matrix and the dispersed rubber phase was specified both as a function of the volume fraction ratio and, independently, to be close to a value of one in order to produce a high concentration of small particle size vulcanized rubber particles dispersed in a thermoplastic phase. EP969039A1 further discloses that small particle size rubber dispersed in a thermoplastic resin matrix was important in order to achieve acceptable durability of the resulting composition, particularly where such compositions are intended to be used as innerliners in pneumatic tires.

Compositions exhibiting low gas permeability performance (i.e., functioning as a gas barrier) composed of thermoplastic resin/thermoplastic resin-based blends such as a high density polyethylene resin and nylon 6 or nylon 66 (HDPE/PA6.66), a polyethylene terephthalate and aromatic nylon (PET/MXD6), a polyethylene terephthalate and vinyl alcohol-ethylene copolymer (PET/EVOH), where one thermoplastic resin is layered over the other layer to form plural layers by molding, and processes for producing the same, are disclosed, for example, by I. Hata, Kobunshi (Polymers), 40 (4), 244 (1991). Further, an application regarding the use of such a composition as the innerliner layer of a tire is disclosed in Japanese Patent Application No. 7-55929. However, since these materials are thermoplastic resin/thermoplastic resin blends, while they are superior in gas barrier performance, they lack flexibility, and therefore, such films are liable to break when the tire is in use.

Thus, nylon polymers can be useful in polymer compositions for reducing the permeability of air and other fluids through a tire innerliner composition and elsewhere, for example, from the inside to the outside surface of a tire or hose. However, it is also known that nylon can be moisture sensitive or hygroscopic, the latter term being generally understood to mean that nylon will absorb moisture from the air. Consequently, moisture that may be present in the air contained in a pneumatic tire air chamber may be absorbed by the nylon present in a tire innerliner construction. The absorbed moisture may thereafter permeate through the various layers of a tire construction and, possibly, result in a bubble or blister within a layer or between layers thereby making it more susceptible to failure due to separation of the layers, in order to avoid such failures it is necessary to find a means of reducing the moisture vapor transmission rate of innerliner and other air or fluid permeation layers.

U.S. Pat. No. 5,738,158 discloses a pneumatic tire having an air permeation prevention layer or innerliner layer composed of a thin film of a resin composition including at least 20% by weight of a thermoplastic polyester elastomer comprised of a block copolymer of polybutylene terephthalate and polyoxyalkylene diimide diacid at a weight ratio of polybutylene terephthalate/polyoxyalkylene diimide diacid of 85/15 or less. The resin composition can further include dispersed rubber particles wherein the rubber particles have been dynamically vulcanized. The concept of using a resin composition as an innerliner layer has been further developed, see, e.g., U.S. Pat. No. 6,079,465, which describes a pneumatic tire that incorporates such an innerliner and discloses the use of various thermoplastic resins for use in the composition. This patent also discloses the presence of a tie layer and another layer to promote bond or adhesive strength of the innerliner layer in the overall structure. The further development of this technology to improve adhesion of the innerliner layer in the structure is described in U.S. Pat. No. 6,062,283 wherein melt viscosities and solubility parameters of thermoplastic resin components and elastomer components are controlled according to a specific mathematical formula. This patent also describes a pneumatic tire having an air permeation preventive layer comprising a low permeability thermoplastic elastomer composition comprising a thermoplastic elastomer having a thermoplastic resin composition as a continuous phase and a rubber composition as a dispersed phase, in which a barrier resin composition is contained, which low permeability thermoplastic elastomer composition has a phase structure in which the barrier resin composition is dispersed in the form of a flat state in the thermoplastic elastomer, is abundant in flexibility, is superior in gas permeation preventive property, and enables the tire to be reduced in weight. The patent also describes the use of a resin film layer to achieve coloration of the innermost and/or outermost surfaces of the tire.

U.S. Pat. No. 6,136,123 (and its divisional U.S. Pat. No. 6,402,867) describe a process for producing a pneumatic tire using, as an air permeation preventive layer, a strip-shaped or cylindrical-shaped single-layer or multiple-layer thermoplastic film, comprising: applying, to at least a part of the joining portion of the thermoplastic film or tire member facing the thermoplastic film, a tackifier-adhesive composition containing a polymer component having an absolute value of the difference of the critical surface tension with the rubber component of the tire member and the polymer component of the surface layer of the thermoplastic film of not more than 6 mN/m, respectively.

Other references of interest include: WO 2004/081107, WO 2004/081106, WO 2004/081108, WO 2004/081116, WO 2004/081099, U.S. Pat. Nos. 4,480,074; 4,873,288; 5,073,597; 5,157,081; 5,910,544; 6,079,465; 6,346,571; 6,538,066; and 6,814,118.

SUMMARY OF THE INVENTION

One embodiment of the invention relates to a layered construction comprising at least three layers, one of which layers comprise a fluid permeation prevention layer having an upper and a lower surface, at least one thermoplastic layer in laminate relation with at least said fluid permeation prevention layer lower surface, said thermoplastic layer comprising a film-forming semi-crystalline carbon chain polymer having a glass transition temperature, Tg, of less than about $-20°$ C., and said third layer comprising at least one high diene rubber; wherein said fluid permeation prevention layer comprises a polymer composition having an air permeation coefficient of $25 \times 10^{-12}$ cc·cm/cm$^2$ sec cmHg (at $30°$ C.) or less and a Young's modulus of 1 to 500 MPa, said layer of said polymer composition comprising: (A) at least 10% by weight, based on the total weight of the polymer composition, of at least one thermoplastic resin component having an air permeation coefficient of $25 \times 10^{-12}$ cc·cm/cm$^2$ sec cmHg (at $30°$ C.) or less and a Young's modulus of more than 500 MPa, which resin component is selected from the group consisting of polyamide resins, polyester resins, polynitrile resins, polymethacrylate resins, polyvinyl resins, cellulose resins, fluororesins, and imide resins, and (B) at least 10% by weight, based on the total weight of the polymer composition, of at least one elastomer component having an air permeation coefficient of more than $25 \times 10^{-12}$ cc·cm/cm$^2$ sec cmHg (at $30°$ C.) and a Young's modulus of not more than 500 MPa, which elastomer component is selected from the group consisting of diene rubbers and the hydrogenates thereof, halogen-containing rubbers, silicone rubbers, sulfur-containing rubbers, fluoro-rubbers, hydrin rubbers, acryl rubbers, ionomers and thermoplastic elastomers, the total amount (A)+(B) of the component (A) and the component (B) being not less than 30% by weight based on the total weight of the polymer composition, wherein the elastomer component (B) is dispersed in a vulcanized state, as a discontinuous phase, in a matrix of the thermoplastic resin component (A) in the polymer composition. Adhesion or bonding of the hydrophobic thermoplastic layer(s) to the layer(s) on which they are applied or to which they are in laminate relation, can include an adhesive composition or layer in order to improve the bonding between such layers, including, bonding of the thermoplastic layer to the fluid permeation prevention layer and/or the carcass layer of a pneumatic tire.

In a preferred aspect, this invention relates to a tire comprising a carcass, an innerliner and a thermoplastic film layer on the surface of the innerliner facing the air chamber and where the innerliner comprises a dynamically vulcanized alloy of an engineering resin and a halogenated copolymer of an isoolefin and a para-alkylstyrene, and the thermoplastic film comprises a polymer selected from the group consisting of ethylene homopolymers and copolymers, for example, low density polyethylene. In another aspect, the invention relates to a hose comprising the improved vulcanizable layered construction.

DETAILED DESCRIPTION

Figure 1:
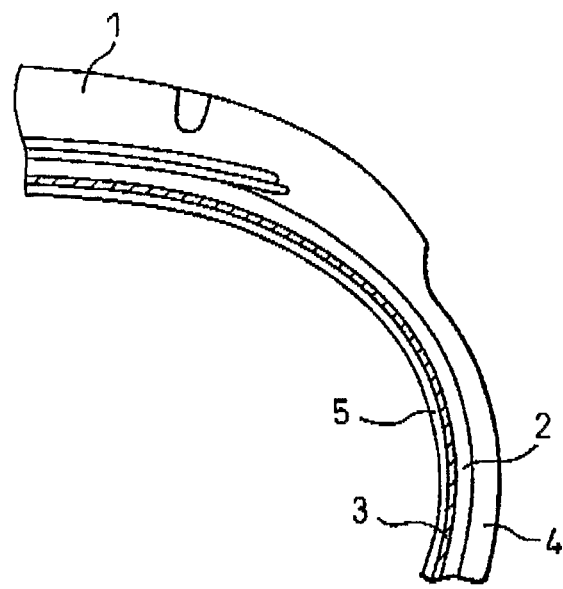
FIG. 1 is a simplified, partial cross-sectional view of a tire showing the location of various layers in a tire including a carcass layer, an innerliner layer and a substantially hydrophobic or moisture vapor transmission resistant layer.

In one aspect of the present invention there is provided a solution to the problem of moisture vapor transmission by using at least one layer of a highly moisture impermeable film as a surface layer on one or more surfaces of the nylon-containing layer. In another aspect the present invention may be useful in tires employing conventional innerliner compositions based on halogenated isobutylene-containing elastomer components and particularly in combination with thermoplastic elastomeric tire innerliner compositions based on vulcanized blends of engineering resins, e.g., polyamides, and brominated isobutylene-paramethylstyrene (BIMS) elastomers, produced, for example, using dynamic vulcanization, as disclosed in EP722850B1. In a further aspect, among others, the present invention is also useful in other applications in which an air or fluid holding layer comprises nylon and typically where such layer is used in combination with one or more other layers, for example, hoses useful for transporting various fluids, including gaseous and liquid as well as mixtures.

For purposes of the present invention, the term "hydrophobic" will be understood to be a qualitative term referring to the water-avoiding nature of a material, compound or species; lacking or having a low affinity or attraction for water; tending to repel and not absorb water; having a low degree of moisture absorption, tending not to dissolve in or mix with or be wetted by water; having the property of not mixing readily with water; hydrophobic compounds are typically non-polar compounds, without charged or electronegative atoms, and often contain many CH bonds. Thus the phrase "substantially hydrophobic" will be understood to refer to a matter of degree, tending to be more rather than less hydrophobic, generally in the direction of being completely water repellent or absorbing very low levels of water. These descriptions can be understood to apply to a material, compound, composition, mixture or substance so that one of ordinary skill in the art would understand from these descriptions that both a polyolefin film and a glass surface are hydrophobic even though measurable levels of moisture may be present in the polyolefin and none may be present in the glass. In contrast, nylon is generally understood to be hydrophilic.

As used herein, the new numbering scheme for the Periodic Table Groups are as disclosed in CHEMICAL AND ENGINEERING NEWS, 63 (5), 27 (1985). AH molecular weights are weight average unless otherwise noted.

Throughout the entire specification, including the claims, the word "comprise" and variations of the word, such as "comprising" and "comprises," as well as "have," "having," "includes," "include" and "including," and variations thereof, means that the named steps, elements or materials to which it refers are essential, but other steps, elements or materials may be added and still form a construct with the scope of the claim or disclosure. When recited in describing the invention and in a claim, it means that the invention and what is claimed is considered to what follows and potentially more. These terms, particularly when applied to claims, are inclusive or open-ended and do not exclude additional, unrecited elements or methods steps.

In the present context "consisting essentially of" is meant to exclude any element or combination of elements as well as any amount of any element or combination of elements that would alter the basic and novel characteristics of the invention. Thus, by way of example, a layered construction in which a substantially hydrophilic polymer or substantially hydrophilic polymer combination is used to the exclusion of a hydrophobic or substantially hydrophobic polymer combination in a layer, the hydrophobic layer, adjoining the fluid permeation prevention layer and in which a fluid permeation prevention layer is prepared from a composition other than by dynamically vulcanizing an engineering resin-containing composition would be excluded. Similarly, and again for exemplary purposes only, a hydrophobic layer containing an amount of additive or blend polymer which would alter the moisture vapor transmission rate of the resulting hydrophobic layer or overall layered structure to a level not contemplated by the invention would be excluded.

For purposes of the present invention, unless otherwise defined with respect to a specific property, characteristic or variable, the term "substantially" as applied to any criteria, such as a property, characteristic or variable, means to meet the sorted criteria in such measure such that one skilled in the art would understand that the benefit to be achieved, or the condition or property value desired is met.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the derivative form the monomer. However, for ease of reference the phrase "comprising the (respective) monomer" or the like is used as shorthand. Isoolefin refers to any olefin monomer having two substitutions on the same carbon. Multiolefin refers to any monomer having two or more double bonds. In a preferred embodiment, the multiolefin is any monomer comprising two conjugated double bonds such as a conjugated diene like isoprene.

Elastomer as used herein, refers to any polymer or composition of polymers consistent with the ASTM D1566 definition. The terms may be used interchangeably with the term "rubber(s)."

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptyloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

In various preferred embodiments, the present invention is directed to a layered construction comprising at least one layer comprising an engineering thermoplastic resin as a continuous phase and a vulcanized elastomer as a dispersed phase. Such a composition is prepared, for example by utilizing technology known as dynamic vulcanization and the resulting composition is known as a dynamically vulcanized alloy (DVA); details of such a composition and its method of preparation are described in detail hereinafter. The construction further comprises an elastomeric composition layer comprising a high diene rubber, for example, natural rubber and/or styrene butadiene rubber, further described hereinafter. Each of these layers typically contains additional components such as reinforcing agents and process aids, for example, carbon black and/or exfoliated, intercalated, or simply dispersed clay and rubber processing oil, respectively. The elastomeric composition layer or high diene rubber-containing layer is typically prepared by standard rubber compounding methods, and includes crosslinking agents or curatives, frequently referred to as a cure system comprising a mixture of two or more individual components, so that the resulting composition is vulcanizable. On the surface of the engineering thermoplastic resin layer that is adjacent to the fluid that is being retained by the layered construction, is a hydrophobic film layer. Optionally, sandwiched between the elastomeric composition layer and the other surface of the engineering thermoplastic resin layer is a second hydrophobic film layer. When such an optional second hydrophobic layer is used, typically there is also used an adhesive composition or adhesive layer between the hydrophobic layer and the elastomeric composition layer in order to improve interlayer bonding between these two layers. Optionally there is also an adhesive composition or adhesive layer between the first hydrophobic layer and the engineering thermoplastic resin layer in order to improve adhesion between these layers. Typically, the compositions of the two adhesive layers, if both are present, are the same, although it is not necessary that they be the same. The engineering resin layer of the present invention can comprise at least one reinforcing filler and other components such that it serves to inhibit the permeation of fluids through it. In the context of its use in pneumatic tires, the engineering resin layer serves as a liner, typically at the innermost surface of the tire construction and is referred to in the tire industry as an innerliner. Its composition and method of preparation are designed by one skilled in the art of rubber compounding to inhibit the passage of air or oxygen through the layer so as to maintain tire pressure over extended periods of time. Avoidance of permeation also reduces the chances of interlayer gas pressure buildup, which can lead to premature failure or delamination. The use of at least one hydrophobic film layer, typically a thermoplastic film, and optionally two such hydrophobic film layers, significantly inhibits the permeability of both a fluid such as air and a fluid such as moisture vapor, from the innermost surface of the layered construction through to the outermost surface of the layered construction and into, for example, the atmosphere. Thus the high air impermeability of an engineering resin such as a polyamide or nylon can be supplemented by a hydrophobic film in order to significantly inhibit the passage or permeation of moisture vapor through such a construction and thereby reduce the chance of interlayer failure caused by the volumetric expansion of such vapor.

When the engineering resin layer is used as the innermost layer of a hose construction, it will also inhibit passage of fluids through it. Such fluids can include air, oxygen and other gases, as well as liquids such as water, fluorocarbons, or industrial fluids. The nature of the fluid to be contained will dictate the selection of the components of the engineering resin-containing layer, including the choice of vulcanizable rubber used to prepare the DVA composition. Such selections are well known to a compounder in the hose industry.

When the engineering resin-containing layer is used as a tire innerliner, the tire innerliner composition of the present invention may be used in producing innerliners for motor vehicle tires such as truck tires, bus tires, passenger automobile, motorcycle tires, moped tires, all terrain vehicle tires, and the like. Furthermore, such a layer can be used in tires intended for non-motorized vehicles such as bicycles.

The first layer is typically a composition comprising a high diene rubber, such as a film or sheet or tire carcass layer. Alternatively, such first layer can be a tubular layer of a hose construction. This layer can also comprise reinforcing fibers such as tire cords or other suitable reinforcement useful in tire applications or hose applications.

If an optional second hydrophobic film layer is not used, then the second layer is typically a dynamically vulcanized alloy (DVA) composition as described in detail below and is typically present in the form of a sheet or a film, but may also be present in the form of a tubular layer of a hose construction. If the optional second hydrophobic film layer is used then the DVA layer is the third layer.

The hydrophobic layer is typically present in the form of a sheet or film that is formed, e.g., by the use of extrusion or calendaring processes and it is introduced by forming multiple layers in a single extrusion or calendaring operation.

Halogenated rubber is defined as a rubber having at least about 0.1 mole % halogen, such halogen selected from the group consisting of bromine, chlorine and iodine. Preferred halogenated rubbers useful in this invention include halogenated isobutylene-based homopolymers or copolymers. These polymers can be described as random copolymer of a $C_4$ to $C_7$ isomonoolefin derived unit, such as isobutylene derived unit, and at least one other polymerizable unit. In one embodiment of the invention, the halogenated isobutylene-based copolymer is a butyl-type rubber or branched butyl-type rubber, especially brominated versions of these elastomers. (Useful unsaturated butyl rubbers such as homopolymers and copolymers of olefins or isoolefins and other types of elastomers suitable for the invention are well known and are described in RUBBER TECHNOLOGY 209-581 (Maurice Morton ed., Chapman & Hall 1995), THE VANDERBILT RUBBER HANDBOOK 105-122 (Robert F. Ohm ed., RX Vanderbilt Co., Inc. 1990), and Edward Kresge and H. C. Wang in 8 KIRK-OTHMER ENCYCLOPEDIA OF CHEMICAL TECHNOLOGY 934-955 (John Wiley & Sons, Inc. 4th ed. 1993)).

Butyl rubbers are typically prepared by reacting a mixture of monomers, the mixture having at least (1) a $C_4$ to $C_{12}$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment and from 15 to 0.5 wt % in another embodiment, in yet another embodiment, from 8 to 0.5 wt % of the monomer mixture is multiolefin. The isoolefin is preferably a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 0 279 456 and U.S. Pat. Nos. 5,506,316 and 5,162,425. Other polymerizable monomers such as styrene and dichlorostyrene are also suitable for homopolymerization or copolymerization in butyl rubbers. One embodiment of the butyl rubber polymer useful in the invention is obtained by reacting 95 to 99.5 wt % of isobutylene with 0.5 to 8 wt % isoprene, or from 0.5 wt % to 5.0 wt % isoprene in yet another embodiment. Butyl rubbers and methods of their production are described in detail in, for example, U.S. Pat. Nos. 2,356,128, 3,968,076, 4,474,924, 4,068,051 and 5,532,312.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,288,575, 4,554,326, 4,632,963, 4,681,921, 4,650,831, 4,384,072, 4,513,116 and 5,681,901. In one embodiment, the butyl rubber is halogenated in hexane diluent at from 4 to 60° C. using bromine ($Br_2$) or chlorine ($Cl_2$) as the halogenation agent. Post-treated halogenated butyl rubber can also be used, as disclosed in U.S. Pat. No. 4,288,575. The halogenated butyl rubber typically has a Mooney Viscosity of about 20 to about 70 (ML 1+8 at 125° C.); for example, about 25 to about 55 in another embodiment. The halogen content is typically about 0.1 to 10 wt % based on the weight of the halogenated butyl rubber; for example, about 0.5 to 5 wt %; alternatively, about 0.8 to about 2.5 wt %; for example, about 1 to about 2 wt %.

A commercial embodiment of a halogenated butyl rubber useful in the present invention is Bromobutyl 2222 (ExxonMobil Chemical Company). Its Mooney Viscosity is typically about 27 to 37 (ML 1+8 at 125° C., ASTM 1646 and its bromine content is about 1.8 to 2.2 wt % relative to the Bromobutyl 2222. Furthermore, the cure characteristics of Bromobutyl 2222 as provided by the manufacturer are as follows: MH about 28 to 40 dN·m, ML is about 7 to 18 dN·m (ASTM D2084). Another commercial embodiment of the halogenated butyl rubber useful in the present invention is Bromobutyl 2255 (ExxonMobil Chemical Company). Its Mooney Viscosity is about 41 to 51 (ML 1+8 at 125° C., ASTM D1646), and its bromine content is about 1.8 to 22 wt %. Furthermore, its cure characteristics as disclosed by the manufacturer are as follows: MH is from 34 to 48 dN·m, ML is from 11 to 21 dN·m (ASTM D2084).

Another useful embodiment of halogenated butyl rubber is halogenated, branched or "star-branched" butyl rubber. These rubbers are described in, for example, EP 0 678 529 B1, U.S. Pat. Nos. 5,182,333 and 5,071,913, each incorporated herein by reference. In one embodiment, the star-branched butyl rubber ("SBB") is a composition comprising butyl rubber and a polydiene or block copolymer. For purposes of the present invention, the method of forming the SBB is not a limitation. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene or branching agent used to make the SBB.

In one embodiment, the SBB is a composition of butyl or halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber (EPDM), ethylene-propylene rubber (EPM), styrene-butadiene-styrene and styrene-isoprene-styrene block copolymers. Polydienes can be present, based on the total monomer content in wt %, typically greater than 0.3 wt %; alternatively, about 0.3 to about 3 wt %; or about 0.4 to 2.7 wt %.

Preferably the branched or "star-branched" butyl rubber used herein is halogenated. In one embodiment, the halogenated star-branched butyl rubber ("HSBB") comprises a butyl rubber, either halogenated or not, and a polydiene or block copolymer, either halogenated or not. The halogenation process is described in detail in U.S. Pat. Nos. 4,074,035, 5,071, 913, 5,286,804, 5,182,333 and 6,228,978. The present invention is not limited by the method of forming the HSBB. The polydiene/block copolymer, or branching agents (hereinafter "polydienes"), are typically cationically reactive and are present during the polymerization of the butyl or halogenated butyl rubber, or can be blended with the butyl or halogenated butyl rubber to form the HSBB. The branching agent or polydiene can be any suitable branching agent, and the invention is not limited by the type of polydiene used to make the HSBB.

In one embodiment the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in wt %, typically greater than about 0.3 wt %, alternatively about 0.3 to 3 wt %, or about 0.4 to 2.7 wt %.

A commercial embodiment of HSBB useful in the present invention is Bromobutyl 6222 (ExxonMobil Chemical Company), having a Mooney Viscosity (ML 1+8 at 125° C. ASTM D1646) of about 27 to 37, and a bromine content of about 22 to 2.6 wt %. Further, cure characteristics of Bromobutyl 6222, as disclosed by the manufacturer, are as follows: MH is from 24 to 38 dN·m, ML is from 6 to 16 dN·m (ASTM D2084).

Preferred isoolefin/para-alkylstyrene copolymers include random copolymers comprising a $C_4$ to $C_7$ isoolefin, such as isobutylene, and a halomethylstyrene. The halomethylstyrene may be an ortho-, meta-, or para-alkyl-substituted styrene. In one embodiment, the halomethylstyrene is a halomethylstyrene containing at least 80%, more preferably at least 90% by weight of the para-isomer. The "halo" group can be any halogen, desirably chlorine or bromine. The copolymer may also include functionalized interpolymers wherein at least some of the alkyl substituent groups present on the styrene monomer units contain benzylic halogen or another functional group described further below. These interpolymers are herein referred to as "isoolefin copolymers comprising a halomethylstyrene" or simply "isoolefin copolymer."

Preferred isoolefin copolymers can include monomers selected from the group consisting of isobutylene or isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. Preferred isoolefin copolymers may also further comprise multiolefins, preferably a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 279456 and U.S. Pat. Nos. 5,506,316 and 5,162,425. Desirable styrenic monomers in the isoolefin copolymer include styrene, methylstyrene, chlorostyrene, methoxystyrene, indene and indene derivatives, and combinations thereof.

Preferred isoolefin copolymers may be characterized as interpolymers containing the following monomer units randomly spaced along the polymer chain:

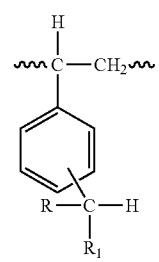

1.

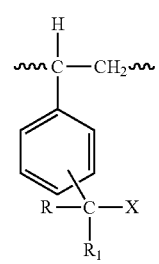

2.

wherein R and $R^1$ are independently hydrogen, lower alkyl, preferably $C_1$ to $C_7$ alkyl and primary or secondary alkyl halides and X is a functional group such as halogen. Desirable halogens are chlorine, bromine or combinations thereof. Preferably R and $R^1$ are each hydrogen. The —$CRR_1H$ and —$CRR_1X$ groups can be substituted on the styrene ring in either the ortho, meta, or para positions, preferably the para position. Up to 60 mole % of the p-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %. The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

Most useful of such copolymers of isobutylene and p-methylstyrene are those containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly(isobutylene-co-p-methylstyrene)" or "brominated poly(isobutylene-co-p-methylstyrene)", and are commercially available under the name EXXPRO™ Elastomers (ExxonMobil Chemical Company, Houston Tex.). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers are brominated polymers which generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mole % of bromine, based on the weight of the polymer, more preferably about 0.1 to about 1.25 mole % bromine, and are substantially free of ring halogen or halogen in the polymer backbone chain. In one embodiment of the invention, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM D1646, modified) is about 30 to about 60 Mooney units.

In another embodiment, the relationship between the triad fraction of an isoolefin and a p-alkylstyrene and the mol % of p-alkylstyrene incorporated into the copolymer is described by the copolymer sequence distribution equation described below and is characterized by the copolymer sequence distribution parameter, m.

$$F=1-\{m\,A/(1+mA)\}$$

where: m is the copolymer sequence distribution parameter,

A is the molar ratio of p-alkylstyrene to isoolefin in the copolymer and,

F is the p-alkylstyrene-isoolefin-p-alkylstyrene triad fraction in the copolymer.

The best fit of this equation yields the value of m for copolymerization of the isoolefin and p-alkylstyrene in a particular diluent. In certain embodiments, m is from less than 38; alternatively, from less than 36; alternatively, from less than 35; and alternatively, from less than 30. In other embodiments, m is from 1-38; alternatively, from 1-36; alternatively, from 1-35; and alternatively from 1-30. Copolymers having such characteristics are disclosed in WO 2004058825 and WO 2004058835.

In another embodiment, the isoolefin/para-alkylstyrene copolymer is substantially free of long chain branching. For the purposes of this invention, a polymer that is substantially free of long chain branching is defined to be a polymer for which $g'_{vis.avg.}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection size exclusion chromatography (SEC) as described below. Such polymers are also disclosed in WO 2004058825 and WO 2004058835.

In another embodiment, the relationship between the triad fraction of an isoolefin and a multiolefin and the mol % of multiolefin incorporated into the halogenated rubber copolymer is described by the copolymer sequence distribution equation below and is characterized by the copolymer sequence distribution parameter, m.

$$F=m\,A/(1+mA)^2$$

where: m is the copolymer sequence distribution parameter,

A is the molar ratio of multiolefin to isoolefin in the copolymer and,

F is the isoolefin-multiolefin-multiolefin triad fraction in the copolymer.

Measurement of triad fraction of an isoolefin and a multiolefin and the mol % of multiolefin incorporated into the copolymer is described below. The best fit of this equation yields the value of m for copolymerization of the isoolefin and multiolefin in each diluent. In certain embodiments, m is from greater than 1.5; alternatively, from greater than 2.0; alternatively, from greater than 2.5; alternatively, from greater than 3.0; and alternatively, from greater than 3.5. In other embodiments, m is from 1.10 to 1.25; alternatively, from 1.15 to 1.20; alternatively, from 1.15 to 125; and alternatively, m is about 1.20. Halogenated rubbers that have these characteristics are disclosed in WO 2004058825 and WO 2004058835.

In another embodiment, the halogenated rubber is substantially free of long chain branching. For the purposes of this invention, a polymer that is substantially free of long chain branching is defined to be a polymer for which $g'_{vis.avg.}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection SEC as follows. The presence or absence of long chain branching in the polymers is determined using triple detection SEC. Triple detection SEC is performed on a Waters (Milford, Mass.) 150C chromatograph operated at 40° C. equipped a Precision Detectors (Bellingham, Mass.) PD2040 light scattering detector, a Viscotek (Houston, Tex.) Model 150R viscometry detector and a Waters differential refractive index detector (integral with the 150C). The detectors are connected in series with the light scattering detector being first, the viscometry detector second and the differential refractive index detector third. Tetrahydrofuran is used as the eluent (0.5 ml/min.) with a set of three Polymer Laboratories, Ltd. (Shropshire, United Kingdom) 10 micron mixed-B/LS GPC columns. The instrument is calibrated against 16 narrow polystyrene standards (Polymer Laboratories, Ltd.). Data is acquired with TriSEC software (Viscotek) and imported into WaveMetric's Igor Pro program (Lake Oswego, Oreg.) for analysis. Linear polyisobutylene is used to establish the relationship between the intrinsic viscosity $[\eta]_{linear}$ determined by the viscometry detector) and the molecular weight ($M_w$, determined by the light scattering detector). The relationship between $[\eta]_{linear}$ and $M_w$ is expressed by the Mark-Houwink equation.

$$[\eta]_{linear} = K M_w^\alpha$$

Parameters K and α are obtained from the double-logarithmic plot of intrinsic viscosity against $M_w$, α is the slope, K the intercept. Significant deviations from the relationship established for the linear standards indicate the presence of long chain branching. Generally, samples which exhibit more significant deviation from the linear relationship contain more significant long chain branching. The scaling factor g' also indicates deviations from the determined linear relationship.

$$[\eta]_{sample} = g'[\eta]_{linear}$$

The value of g' is defined to be less than or equal to one and greater than or equal to zero. When g' is equal or nearly equal to one, the polymer is considered to be linear. When g' is significantly less than one, the sample is long chain branched. See e.g. E. F. Casassa and G. C. Berry in "Comprehensive Polymer Science," Vol. 2, (71-120) G. Allen and J. C. Bevington, Ed., Pergamon Press, New York, 1988. In triple detection SEC, a g' is calculated for each data slice of the chromatographic curve. A viscosity average g' or $g'_{vis.avg.}$ is calculated across the entire molecular weight distribution. The scaling factor $g'_{vis.avg.}$ is calculated from the average intrinsic viscosity of the sample.

$$g'_{vis.avg.} = [\eta]_{avg.} / (K M_w^\alpha)$$

Other preferred halogenated rubbers include halogenated isobutylene-p-methylstyrene-isoprene copolymer as described in WO 01/21672A1.

The halogenated rubbers useful in the fluid permeation prevention layer and tie layer may be the same or different.

For purposes of the present invention, an engineering resin is defined to be any thermoplastic polymer, copolymer or mixture thereof having a Young's modulus of more than 500 MPa and, preferably, an air permeation coefficient of less than $60 \times 10^{-12}$ cc cm/cm² sec cm Hg (at 30° C.), including, but not limited to, one or more of the following:

a) polyamide resins: nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PEN), liquid crystal polyester, polyoxalkylene diimide diacid/polybutyrate terephthalate copolymer and other aromatic polyesters;

c) polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;

d) polymethacrylate resins: polymethyl methacrylate, polyethylacrylate;

e) polyvinyl resins (for illustration, not limitation): vinyl acetate (EVA), polyvinyl alcohol (PVA), vinyl alcohol/ethylene copolymer (EVOA), polyvinylidene chloride (PVDC), polyvinyl chloride (PVC), polyvinyl/polyvinylidene copolymer, polyvinylidene chloride/methacrylate copolymer;

f) cellulose resins: cellulose acetate, cellulose acetate butyrate;

g) fluorine resins: polyvinylidene fluoride (PVDF), polyvinyl fluoride (PVF), polychlorofluoroethylene (PCTFE), tetrafluoroethylene/ethylene copolymer (ETFE);

h) polyimide resins: aromatic polyimides);

i) polysulfones;

j) polyacetals;

k) polyactones;

l) polyphenylene oxide and polyphenylene sulfide;

m) styrene-maleic anhydride;

n) aromatic polyketones; and o) mixtures of any and all of a) through n) inclusive as well as mixtures of any of the illustrative or exemplified engineering resins within each of a) through n) inclusive.

For purposes of the present invention, this definition of engineering resin excludes polymers of olefins, such as polyethylene and polypropylene.

Preferred engineering resins include polyamide resins and mixtures thereof; particularly preferred resins include Nylon 6, Nylon 66, Nylon 6 66 copolymer, Nylon 11, and Nylon 12 and their blends.

High diene content rubber or elastomer, also referred to as high diene monomer rubber, is a rubber comprising typically at least 50 mole % of a $C_4$-$C_{12}$ diene monomer, typically at least about 60 mole % to about 100 mole %; more preferably at least about 70 mole % to about 100 mole %; more preferably at least about 80 mole % to about 100 mole %.

Useful high diene monomer rubbers include homopolymers and copolymers of olefins or isoolefins and multiolefins, or homopolymers of multiolefins. These are well known and are described in RUBBER TECHNOLOGY, 179-374 (Maurice Morton ed., Chapman & Hall 1995), and THE VANDERBILT RUBBER HANDBOOK 22-80 (Robert F. Ohm ed., R.T. Vanderbilt Co., Inc. 1990). Preferred examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures.

Another useful group of high diene monomers rubbers includes styrenic block copolymers such as those having styrene contents of 5 wt. % to 95 wt. %, preferably 10 wt. % to 85 wt. %, more preferably 15 wt. % to 70 wt. %. Preferred styrenic block copolymers (SBC's) include those that generally comprise a thermoplastic block portion A and an elastomeric block portion B. The block portion A are the hard blocks and are derived from materials which have a sufficiently high glass transition temperature to form crystalline or glassy domains at the use temperature of the polymer. Such hard blocks generally form strong physical "crosslinks" or agglomerates with other hard blocks in the copolymers. The hard block portion, A, generally comprises a polyvinylarene derived from monomers such as styrene, alpha-methyl styrene, other styrene derivatives, or mixtures thereof. The hard block portion A may also be a copolymer derived from styrenic monomers such as those described above and olefinic monomers such as ethylene, propylene, butene, isoprene, butadiene, and mixtures thereof. Useful such polymers for the present invention typically include less than about 50% glassy phase such that the glass transition of the polymer, Tg, should be less than about −50° C.

In one embodiment, the hard block portion A is polystyrene, having a number-average molecular weight between from about 1,000 to about 200,000, preferably from about 2,000 to about 100,000, more preferably from about 5,000 to about 60,000. Typically the hard block portion A comprises from about 5% to about 80%, preferably from about 10% to about 70%, more preferably from about 10% to about 50% of the total weight of the copolymer.

The material forming the B-block preferably has a sufficiently low glass transition temperature at the use temperature of the polymer such that crystalline or glassy domains are not formed at these working temperatures. The B-block are thus typically regarded as a soft block. The soft block portion B is typically an olefinic polymer derived from conjugated aliphatic diene monomers of from about 4 to about 6 carbon atoms or linear alkene monomers of from about 2 to about 6 carbon atoms. Suitable diene monomers include butadiene, isoprene, and the like, whereas suitable alkene monomers include ethylene, propylene, butene, and the like, in each instance, mixtures are also suitable. The soft block portion B preferably comprises a substantially amorphous polyolefin such as ethylenes/propylene polymers, ethylene/butene polymers, polyisoprene, polybutadiene, and the like or mixtures thereof. The number-average molecular weight of the soft block B is typically from about 1,000 to about 300,000, preferably from about 10,000 to about 200,000, and more preferably from about 20,000 to about 100,000.

Typically the soft block portion B comprises from about 20% to about 90%, preferably from about 30% to about 80%, more preferably from about 40% to about 80% of the total weight of the copolymer.

Suitable SBC's for use in the compositions described herein include at least one substantially thermoplastic block portion A and at least one substantially elastomeric block portion B. The SBC's may have multiple blocks.

In one embodiment, the SBC's may be an A-B diblock copolymer. In another embodiment, the block copolymer may be an A-B-A triblock copolymer. In still other embodiments, the SBC's may be selected as A-B-A-B tetrablock copolymers, or A-B-A-B-A pentablock copolymers.

In another embodiment, the SBC's are triblock copolymers having an elastomeric midblock B and thermoplastic endblocks A and A', wherein A and A' may be derived from different vinylarene monomers. In other embodiments, the SBC's have more than one A block and/or more than one B block, wherein each A block may be derived from the same or different vinylarene monomers and each B block may be derived from the same or different olefinic monomers.

The SBC's may also be radial, having three or more arms, each arm being an B-A, B-A-B-A, or the like type copolymer and the B blocks being at or near the center portion of the radial polymer. In other embodiments, the SBC's may have four, five, or six arms.

In one embodiment, the olefinic polymer block comprises at least about 50 wt. % of the block copolymer. The unsaturation in olefinic double bonds may be selectively hydrogenated to reduce sensitivity to oxidative degradation and such hydrogenation may also have beneficial effects on the elastomeric properties. For example, a polyisoprene block can be selectively hydrogenated or reduced to form an ethylene-propylene block. In one embodiment, the vinylarene block typically comprises at least about 10 percent by weight of the SBC. However, higher vinylarene contents may be selected for high elastic and low stress relaxation properties.

Exemplary suitable SBC's for use in for inclusion in the polymeric compositions described herein are styrene-olefinstyrene triblock copolymers such as styrene-butadiene-styrene (S-B-S), styrene-ethylene/butylene-styrene (S-EB-S), styrene-ethylene/propylene-styrene (S-EP-S), styrene-isoprene-styrene (S-I-S), and mixtures thereof. The SBC may be a selected SBC or a blend of SBC's.

In one embodiment, the SBC's for use in the polymeric compositions described herein are polystyrene-ethylene/butylene-polystyrene block copolymers having a styrene content in excess of about 10 weight percent. With higher styrene content, the polystyrene block portions generally have a relatively high molecular weight.

In one embodiment, the SBC has a melt flow rate of about 0.01 to about 150 dg/min. In another embodiment, the SBC has a melt flow rate of about 0.1 to about 100 dg/min. In still another embodiment, the SBC has a melt flow rate of about 1 to about 75 dg/min (each of the melt flow rates as measured by ASTM 1238, 2.16 kg and 230° C.).

In one embodiment, the composition includes a SBC comprised of triblock segments comprised of styrene-derived units and at least one other unit selected from the group consisting of ethylene-derived units, butadiene-derived units, isoprene-derived units, isobutylene-derived units and wherein the styrenic block copolymer is comprised of less than 20 wt. % of diblock segments. In another embodiment, the composition incorporates a SBC comprised of segments selected from the group consisting of SIS, SBS, SEBS, SEPS, and SIBS (styrene-isoprene-butadiene-styrene) units and wherein from about 5% to about 95% of diene units in the styrenic block copolymer are hydrogenated.

Exemplary SBC's for use in the polymeric compositions described herein are commercially available from Dexco Polymers LP under the designations Vector™ and from Kraton Polymers in Houston, Tex. under the designation Kraton™.

Generally, polymer compositions, e.g., those used to produce tires, are crosslinked in the finished tire product. Crosslinking or vulcanization is accomplished by incorporation of curing agents and/or accelerators; the overall mixture of such agents being typically referred to as a cure "system." It is known that the physical properties, performance characteristics, and durability of vulcanized rubber compounds are directly related to the number (crosslink density) and types of crosslinks formed during the vulcanization reaction. (See, e.g., Helt et al., *The Post Vulcanisation Stabilization for NR*, RUBBER WORLD 18-23 (1991). Curing agents include those components described above that facilitate or influence the cure of elastomers, and generally include metals, accelerators, sulfur, peroxides, and other agents common in the art, and as described above. Crosslinking or curing agents include at least one of, e.g., sulfur, zinc oxide, and fatty acids and mixtures thereof. Peroxide-containing cure systems may also be used. Generally, polymer compositions may be crosslinked by adding curative agents, for example sulfur, metal oxides (i.e., zinc oxide, ZnO), organometallic compounds, radical initiators, etc. and heating the composition or mixture. When the method known as "dynamic vulcanization" is used, the process is modified so as to substantially simultaneously mix and vulcanize, or crosslink, at least one of the vulcanizable components in a composition comprising at least one vulcanizable rubber, elastomer or polymer and at least one elastomer or polymer not vulcanizable using the vulcanizing agent(s) for the at least one vulcanizable component, (See, e.g., U.S. Pat. No. 6,079,465 and the references cited therein). In particular, the following are common curatives that can function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., the stearate salts of Zn, Ca, Mg, and Al), or with stearic acid, and either a sulfur compound or an alkylperoxide compound. (See also, *Formulation Design and Curing Characteristics of NBR Mixes for Seals*, RUBBER WORLD 25-30 (1993), To the curative agent(s) there are often added accelerators for the vulcanization of elastomer compositions. The curing agent(s), with or without the use of at least one accelerator, is often referred to in the art as a curing "system" for the elastomers). A cure system is used because typically more than one curing agent is employed for beneficial effects, particularly where a mixture of high diene rubber and a less reactive elastomer is used.

For purposes of dynamic vulcanization in the presence of an engineering resin to form the highly impermeable layer, any conventional curative system which is capable of vulcanizing saturated halogenated polymers may be used to vulcanize at least the elastomeric halogenated copolymer of a $C_4$ to $C_7$ isomonoolefin and a para-alkylstyrene, except that peroxide curatives are specifically excluded from me practice of this invention when the thermoplastic engineering resin(s) chosen are such that peroxide would cause these resins themselves to crosslink since the engineering resin would itself vulcanize or crosslink, thereby resulting in an excessively cured, non-thermoplastic composition. Suitable curative systems for the elastomeric halogenated copolymer component of the present invention include zinc oxide in combination with zinc stearate or stearic acid and, optionally, one or more of the following accelerators or vulcanizing agents: Permalux, the di-ortho-tolylguanidine salt of dicatechol borate; HVA-2, m-phenylene bis maleimide; Zisnet, 2,4,6-trimercapto-5-triazine; ZDEDC, zinc diethyl dithiocarbamate and also including for the purposes of the present invention, other dithiocarbamates; Tetrone A, dipentamethylene thiuram hexasulfide; Vultac 5, alkylated phenol disulfide, SP1045, phenol formaldehyde resin; SP1056, brominated alkyl phenol formaldehyde resin; DPPD, diphenyl phenylene diamine; salicylic acid, ortho-hydroxy benzoic acid; wood rosin, abietic acid; and TMTDS, tetramethyl thiuram disulfide, used in combination with sulfur.

Dynamic vulcanization is conducted at conditions to vulcanize at least partially, preferably fully, the elastomeric halogen-containing copolymer of the air permeation prevention layer.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer-containing composition to be considered "cured," "vulcanized" or "crosslinked." For example, for purposes of the present invention, a tire comprising the tie layer is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks. With limited experimentation using known tools and standard techniques, one skilled in the art can readily determine the appropriate or optimum cure time required for the elastomers) and polymers) selected for use in the tie layer composition, as well as the amount and type of crosslinking agent(s) and accelerator(s) and the curing temperature that will be used to manufacture the tire.

Accelerators include amines, guanidines, thioureas, thiazoles, thiurams, sulfonamides, sulfenimides, thiocarbamates, xanthates, and the like. Acceleration of the cure process may be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea. Curatives, accelerators and cure systems useful with one or more crosslinkable polymers are well-known in the art.

In one embodiment of the invention, at least one curing agent is typically present at about 0.1 phr to about 15 phr; alternatively at about 0.5 phr to about 10 phr.

The composition described herein may have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black and the like. Reinforcing grade carbon black is most preferred. The filler may also include other reinforcing or non-reinforcing materials such as silica, clay, calcium carbonate, talc, wollastonite, titanium dioxide and the like. The filler is normally present in the innerliner at a level of from about 20 to about 50% by weight of the total composition, more preferably from about 25 to 40% by weight. In one embodiment, the filler is carbon black or modified carbon black. The preferred filler is semi-reinforcing grade carbon black, typically used at a level of about 10 to 150 parts per hundred of rubber, by weight (phr), more preferably about 30 to about 120 phr. Useful grades of carbon black as described in RUBBER TECHNOLOGY 59-85 (1995) include N110 to N990. More desirably, grades of carbon black useful in, for example, tire treads, such as N229, N351, N339, N220, N234 and N110 provided in ASTM (D3037, D1510, and D3765) are useful herein. Embodiments of carbon black useful in, for example, tire sidewalls such as N330, N351, N550, N650, N660, and N762 are particularly useful herein. Embodiments of carbon black useful in, for example, innerliners or innertubes, such as N550, N650, N660, N762, N990, and Regal 85 (Cabot Corporation, Alpharetta, Ga.) and the like are similarly particularly useful herein.

Exfoliated, intercalated, or dispersed clays may also be present in the composition. These clays, also referred to as "nanoclays", are well known, and their identity, methods of preparation and blending with polymers is disclosed in, for example, JP 2000109635, JP 2000109605, JP 11310643; DE 19726278; WO98/53000; and U.S. Pat. Nos. 5,091,462, 4,431,755, 4,472,538, and 5,910,523. Swellable layered clay materials suitable for the purposes of the present invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness typically about 4 to about 20 Å in one embodiment, and about 8 to about 12 Å in another embodiment, bound together and containing exchangeable cations such as $Na^+$, $Ca^{+2}$, $K^+$ or $Mg^{+2}$ present at the interlayer surfaces.

Layered clay may be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{30}$ alkyls or alkenes which may be the same or different. In one embodiment, the exfoliating agent is a so-called long chain tertiary amine, wherein at least $R_1$ is a $C_{12}$ to $C_{20}$ alkyl or alkene.

Another class of swelling agents include those which can be covalently bonded to the interlayer surfaces. These include polysilanes of the structure $-Si(R')_2R^2$ where R' is the same or different at each occurrence and is selected from alkyl, alkoxy or oxysilane and $R_2$ is an organic radical compatible with the matrix polymer of the composite. Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 and WO92/02582.

In a preferred embodiment of the invention, the exfoliating or swelling agent is combined with a halogenated polymer. In one embodiment the agent includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, dihydrogenated tallowalkyl-methylamine and the like, and amine-terminated polytetrahydrofuran; long-chain thiol and thiosulfate compounds such as hexamethylene sodium thiosulfate. In another embodiment of the invention, improved interpolymer impermeability is achieved by the use of polyfunctional curatives such as hexamethylene bis(sodium thiosulfate) and hexamethylene bis(cinnamaldehyde).

The amount of exfoliated, intercalated, or dispersed clay incorporated in the composition in accordance with this invention is an amount sufficient to develop an improvement in the mechanical properties or barrier properties of the composition, e.g. tensile strength or air/oxygen permeability. Amounts typically can be from about 0.5 wt % to about 15 wt % in one embodiment, or about 1 wt % to about 10 wt % in another embodiment, and about 1 wt % to about 5 wt % in yet another embodiment, based on the polymer content of the composition. Expressed in parts per hundred rubber, the exfoliated, intercalated, or dispersed clay may be present at about 1 phr to about 30 phr in one embodiment, and about 3 phr to about 20 phr in another embodiment. In one embodiment, the exfoliating clay is an alkylamine-exfoliating clay.

As used herein, the term "process oil" means both the petroleum derived process oils, synthetic plasticizers and reactive plasticizers. A process or plasticizer oil may be present in air barrier compositions, but the amount of such materials is limited because they tend to detract from the fluid permeation prevention properties of the composition. The oils or plasticizers are primarily used to improve the processing of the composition during preparation of the layer, e.g., mixing, calendaring, etc. Generally suitable plasticizer oils include aliphatic acid esters or hydrocarbon plasticizer oils such as paraffinic or naphthenic petroleum oils. In addition, plasticizers such as organic esters and other synthetic plasticizers can be used. A particularly preferred plasticizer for use in a DVA composition is N-butylsulfonamide or other plasticizers suitable for polyamides. In another embodiment, rubber process oils such as naphthenic, aromatic or paraffinic extender oils may be present at about 1 phr to about 5 phr. Alternatively, the dynamically vulcanized fluid barrier compositions of the present invention can include a reactive softener or plasticizer. Such materials are typically based on maleated ethylene ethyl acrylate (EEA); maleated ethylene oxide (EO) and maleated ethylene propylene (EP) copolymers (such as Exxelor brand from ExxonMobil Chemical Company); ethylene acrylic ester terpolymers based on methyl-, ethyl- or butyl-acrylate and the third monomer, either maleic anhydride or glycidyl methacrylate (Lotader brand from Arkema, Inc.); and other epoxidized polymers are also useful, such as epoxidized natural rubber and epoxidized styrene-butadiene-styrene (SBS) terpolymers. In still another embodiment, naphthenic, aliphatic, paraffinic and other aromatic oils are substantially absent from the composition. By "substantially absent", it is meant that naphthenic, aliphatic, paraffinic and other aromatic oils may be present, if at all, to an extent no greater than 2 phr in the composition.

The term "dynamic vulcanization" is used herein to denote a vulcanization process in which the engineering resin and the rubber are mixed under conditions of high shear and elevated temperature in the presence of a curing agent. As a result, the rubber is simultaneously crosslinked and dispersed as fine particles, for example, in the form of a microgel, within the engineering resin which forms a continuous matrix; the resulting composition is known in the art as a "dynamically vulcanized alloy" or DVA. Dynamic vulcanization is effected by mixing the ingredients at a temperature which is at or above the curing temperature of the rubber using in the equipment such as roll mills, Banbury® mixers, continuous mixers, kneaders, or mixing extruders (such as twin screw extruders). The unique characteristic of the dynamically cured composition is that, notwithstanding the fact that the rubber is cured, the composition can be processed and reprocessed by conventional thermoplastic processing techniques such as extrusion, injection molding, compression molding, etc. Scrap and or flashing can also be salvaged and reprocessed.

The dynamic vulcanization process is conducted at conditions to vulcanize at least partially, preferably folly, the elastomeric halogen-containing copolymer. To accomplish this, the thermoplastic engineering resin, the elastomeric copolymer and optional other polymers, are mixed together at a temperature sufficient to soften the resin or, more commonly, at a temperature above its melting point when the resin is crystalline. Preferably the cure system is premixed in the elastomer component. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is typically from about the melting point of the resin to about 300° C.; for example, the temperature may range from about the melting point of the matrix resin to about 275° C. Preferably the vulcanization is carried out at a temperature range from about 10° C. to about 50° C. above the melting temperature of the matrix resin.

It is preferred that the mixing process be continued until the desired level of vulcanization or crosslinking is completed. If vulcanization is permitted to continue after mixing has stopped, the composition may not be reprocessable as a thermoplastic. However, dynamic vulcanization can be carried out in stages. For example, vulcanization can be commenced in a twin screw extruder and pellets formed of the DVA material or material using an underwater pelletizer, thereby quenching the vulcanization before it is completed. The vulcanization process can be completed at a later time under dynamic vulcanization conditions. Those skilled in the art will appreciate the appropriate quantities, types of curatives and extent of mixing time required to carry out the vulcanization of the rubber. Where necessary or desirable to establish the appropriate concentrations and conditions, the rubber alone can be vulcanized using varying amounts of curative, which may include one or more curatives and/or accelerators, to determine the optimum cure system to be utilized and the appropriate cure conditions to achieve a substantially full cure. While it is preferred that all components be present in the mixture prior to carrying out the dynamic vulcanization process, this is not a necessary condition. For example, in one embodiment, the elastomer to be cured can be dynamically vulcanized in the presence of a portion or all of the thermoplastic engineering resin. This blend can then be let down, or dispersed under suitable conditions into additional thermoplastic engineering resin. Similarly, it is not necessary to add all of the fillers and oil, when used, prior to the dynamic vulcanization stage. A portion or all of the fillers and oil can be added after the vulcanization is completed. Certain ingredients, such as stabilizers and process aids function more effectively if they are added after curing.

In an alternative embodiment, the dynamic vulcanization process is conducted according to the technology and method disclosed in PCT/US2005/38824, filed Oct. 27, 2005, entitled "Thermoplastic Elastomer Composition and Process for Producing Same," hereby incorporated by reference. When such technology is used it is possible to achieve a dynamically vulcanized composition in which the small vulcanized particles formed by dynamic vulcanization comprise greater than about 60 volume % of the volume of the elastomer and engineering resin composition. The unusually high concentration is achieved by utilizing a fractional, staged addition sequence of the halogenated elastomer components) during the dynamic vulcanization process, as described in the application.

The degree of cure of the vulcanized rubber can be described in terms of gel content, cross-link density, the amount of extractable components or it can be based on the state of cure that would be achieved in the rubber were it to be cured in the absence of the resin. For example, in title present invention, it is preferred that the halogenated elastomer achieve about 50 to about 85% of full cure based on the elastomer per se as measured, e.g., by tensile strength or using the oscillating disc cure meter test (ASTM D 2084, Standard Test Method for Rubber Property-Vulcanization Using Oscillating Disk Cure Meter).

Typically, the hydrophobic, or substantially hydrophobic, layer comprises a thermoplastic polymer or copolymer that substantially resists water absorption. For convenience, this layer is also referred to herein as the thermoplastic layer. Useful or suitable materials for this layer are also described as semi-crystalline carbon chain polymers or copolymers, including blends of such polymers and copolymers. The semi-crystalline character of the polymer provides for its ability to be formed into a film which is preferred in the present application. Its carbon chain character contributes to its substantially hydrophobic property. Such carbon chain polymers include polymers and copolymers known to those skilled in the art as polyolefins, styrenics, vinyls, acrylics, fluorocarbons, and diene polymers. The preferred polymers should have an equilibrium water content at 100% relative humidity of less than about 0.1 g per 100 g polymer or a molar water content per structural unit under the same conditions of less than about 0.1. Various polymers are suitable for use in the present invention, those typically useful include polyolefins such as ethylene homopolymers and copolymers, for example, as low density polyethylene (LDPE), linear low density polyethylene (LLDPE), high density polyethylene (HDPE), ethylene-alpha olefin copolymers wherein the alpha olefin includes one to about eight carbon atoms, including, but not limited to, ethylene-styrene, ethylene-propylene, ethylene-butene, ethylene-hexene, ethylene-octene, and the like. Useful polymers can be suggested by a combination of properties, as noted, and further by using the information provided in D. W. Van Krevelen, "Properties of Polymers," $3^{rd}$ edition, Elsevier (1990), pages 569-572, incorporated herein by reference (referred to as "Van Krevelen"). Generally, as described in the reference, polymers characterized as hydrophobic typically obey Henry's Law over the complete range of relative pressures and only minute quantities of water are sorbed. Various useful polymers and copolymers include those having structural groups, individually and in combination, and molar water contents as illustrated and summarized in Table 18.11 of Van Krevelen. In other words, the suitability of polymers having different structural groups can be estimated based on the data in the cited Table. Furthermore, polymers useful in the present invention should be suitably flexible under ambient conditions of use of the article in which they are used, for example a pneumatic tire, a hose, etc. Such polymers exhibit a glass transition (Tg) of less than about −20° C., preferably less than about −30° C., most preferably less than about −40° C. In selecting useful polymers one can use a combination of preferred levels of water content as described above and Tg. In another embodiment, useful polymers have an Melt Index (ASTM 1238, condition E) of 01. to 200 dg/mm, preferably 0.5 to 150 dg/min. In another embodiment, useful polymers have an elongation to break of greater 500%, preferably greater than 600%, preferably greater than 650%, as measured by ASTM D-882. In another embodiment, preferred polymers include polyethylene homo and copolymers having a density of 0.900 to 0.96 g/cc, preferably 0.910 to 0.95 g/cc as measured by ASTM-D1505. In another embodiment, preferred polymers include polyethylene homo and copolymers having a melt strength of 2 cN or more, preferably 3 to 100 cN, preferably 4 to 50 cN, preferably 5 c N or more. Melt Strength is measured using a Goettfert Rheotens attached to an Instron capillary rheometer. The polymer melt is extruded through a capillary with a radius of 0.007633 cm and an aspect ratio (capillary length/capillary radius) of 33.531 at a constant plunger velocity. Therefore, the polymer melt is subjected to a constant apparent wall shear rate. The extruded melt is subsequently stretched by a pair of serrated wheels having radii of 1.91 cm at a distance (H) from the capillary exit. The rotational speed of the wheels is increased linearly with time while the draw down force (F) is monitored. Melt strength is reported as the draw down force (cN) when the strand breaks. The following conditions are used in the melt strength measurements: Temperature=190° C., Plunger speed=0.127 cm/s, wheel acceleration=2.4 cm/s/s, capillary radius=0.076327 cm, capillary length=2.5593 cm, barrel radius=0.47625 cm, and wheel radius=1.91 cm. The thermoplastic, substantially hydrophobic layer thickness is typically about 1 micron to about 100 microns; preferably about 1 micron to about 50 microns; or about 1 micron to about 40 microns; for example, about 5 microns to about 35 microns or about 25 microns. Preferably this layer is as thin as can reasonably be processed consistent with achieving the desired or target properties of the finished tire construction. For purposes of the present invention, suitable thermoplastic materials can be identified by measuring the moisture vapor transmission rate (MVTR) of the thermoplastic material being considered and especially that of a layered construction employing such thermoplastic material. A significant reduction in the MVTR of a construction employing one or more layers of the thermoplastic material in or as one of the layers will indicate that such a material is suitable. Naturally, the thickness of the thermoplastic material will affect the level of reduction and a balance can be struck between an improvement in MVTR and maintenance of other physical and dynamic properties necessary for the sound functioning of the article in which such layer(s) is or are incorporated, including, for example, interlayer bond strength, dynamic storage modulus, thermal stability at high and low temperatures, etc. Typically, the MVTR will be about 25% lower than a construction without such a layer; preferably about 30% lower; more preferably about 35% lower; still more preferably about 45% lower; for example, the MVTR can be about 50% lower or more. In a construction employing multiple layers of a substantially hydrophobic thermoplastic film, MVTR can be reduced even further; for example, about 50%, 60%, 70% lower or more. Reduction in MVTR can also encompass values in a range represented by the figures recited as well as intermediate values; for example, 25%-70%; 25%-60%; 30%-50%; 35%-60%; 30%-65%; 33%-55%; etc. Furthermore, the thermoplastic material, for example low density polyethylene, optionally can include other additives or fillers, preferably to further reduce permeability, including, for example, carbon black, calcium carbonate, talc, clay and mixtures thereof. Useful amounts of such supplemental additives are typically about 5 phr to about 60 phr; preferably about 10 phr to about 50 phr; but in each instance where such optional material is included, its concentration is limited to the amount that does not significantly adversely affect elongation to break of the resulting mixture. In other words, the resulting modified thermoplastic material must meet process satisfactorily and achieve acceptable or suitable properties in a composite structure in use.

Further optional, useful additives for use in the fluid permeation prevention layer are typically added at a level of less than about 10 phr and can be selected from the group consisting of pigments, antioxidants, antiozonants, processing aids, tackifiers, and the like and mixtures thereof. Such optional additives can be included at the discretion of the skilled compounder in order to achieve a particular advantage in the composition, e.g., the use of a tackifier to improve contact adhesion during tire building or an antioxidant to improve heat aging characteristics of the cured composition, provided that the essential properties of the composition are not unnecessarily compromised, e.g., impermeability.

Various alternative methods for forming and applying the plastic layers) and the adhesive layers) to the other layers can be used as is well known in the art. For example, various useful plastic shaping methods are described in S. Middleman, "Fundamentals of Polymer Processing," particularly Chapters 6-8, and 10, McGraw-Hill, New York, 1977; Z. Tadmor and C. G. Gogos, "Principles of Polymer Processing," John Wiley & Sons, New York, 1979, Part IV (Shaping), incorporated by reference. In particular, the hydrophobic composition can be formed into a layer suitable for the end use application, using, for example, an extruder or a calendar. Where convenient or useful, extrusion can include the use of equipment allowing for the dual or multiple extrusion of the fluid permeation prevention layer, the hydrophobic layer or multiple hydrophobic layers as discussed herein, an adhesive layer where used, and the high diene rubber layer, for example, a tire carcass layer. In a preferred embodiment, the hydrophobic layer is prepared for use in a tire construction and has a thickness that is typically about 5 mm or less; preferably about 2.5 mm or less; more preferably about 0.2 to about 2.0 mm; most preferably about 0.2 to about 1.5 mm; for example about 0.3 to about 0.9 mm. The thickness of the hydrophobic layer for use in a hose construction can be the same or different depending on the application in which the hose will be employed. For example, an unreinforced, low pressure hose can have different performance requirements than a high pressure, reinforced hose and, similarly, a hose intended for use with a liquid can differ from one for use with a gas. Adjustment of the thickness is within the skill of the product designer, engineer or chemist, based, if necessary, on limited experimentation.

The dynamically vulcanized fluid permeation prevention layer or the hydrophobic layer that is intended to be in contact with the inner surface of the carcass layer of a tire or with the inner surface of a tubular hose structure should exhibit sufficient bonding in order to avoid delamination or failure of the bond between the layers. The same is true of the hydrophobic layer that is laminated to or intended to be in contact with the fluid permeation prevention layer. While the dynamically vulcanized composition of the fluid permeation prevention layer may ordinarily exhibit sufficient bond strength to the carcass layer or inner hose surface, the hydrophobic layer(s) are less likely to exhibit sufficient adhesion to the layers to which they are laminated. Thus, while it is optional, it is useful, alternatively it is preferred, to include a layer or composition to improve adhesion between these components. The optional layer or composition is referred to as an adhesive layer that, in a pneumatic tire for example, is typically situated between the innerliner layer, with or without a hydrophobic layer, and the inside surface of the carcass layer. One or more adhesive layers can be included in order to further improve interlayer adhesion between various layers, as described. When present on the inner surface of the tire carcass or the inner surface of a tubular hose structure, the adhesive layer is typically about 1 micron to about 100 microns in thickness; preferably about 5 microns to about 50 microns; or about 10 microns to about 40 microns; for example, about 20 microns to about 35 microns or about 25 microns. When an adhesive layer is used between the fluid permeation prevention layer and a hydrophobic layer closest to the fluid, its thickness can be the same as recited above or, alternatively, somewhat thinner; typically about 0.5 microns to about 15 microns; alternatively about 0.5 microns to, about 5 microns. The adhesive layer is conveniently formed by co-extrusion with the innerliner layer so that the two layers can then be contacted with the carcass layer; if two adhesive layers are used, both can be co-extruded with the innerliner layer. Alternatively, the adhesive layer can be independently prepared, stored between release sheets and used as needed or it can be formed as a fluid composition and sprayed or brushed on the surface(s) where and when needed; combinations of these techniques can be used. The adhesive layer comprises at least one polymer, copolymer, chemically modified polymers or copolymers and mixtures thereof as well as other additives commonly employed in adhesive compositions. Typical components useful in adhesive compositions include one or more tackifier, curatives, an elastomer component that is co-vulcanizable with diene rubbers, an elastomer component that is co-vulcanizable with nylon or other thermoplastic matrix employed with the innerliner composition, and others well-known to those skilled in the art of rubber, and particularly tire, compounding. Particularly useful polymers include styrene butadiene styrene copolymers (SBS) and epoxidized SBS such as Epofriend brand series of copolymers from Daicel Chemical. Alternatively, the adhesive composition comprises maleated ethylene copolymer, epoxidized ethylene polymers, such as ethylene acrylic ester terpolymers based on methyl-, ethyl- or butyl-acrylate and a third monomer, such as maleic anhydride or glycidyl methacrylate (Lotader brand from Arkema, Inc.; polymers of this type can be particularly useful between a hydrophobic layer comprising an ethylene homopolymer or copolymer such as LDPE and the dynamically vulcanized fluid permeation prevention layer comprising nylon, since the epoxidized ethylene polymer comprises a terpolymer, including maleic anhydride or epoxy species and ethylene species). Such a polymer has been used for preparing an adhesive composition layer between ethylene homopolymers or copolymers, such as polyethylene, and polar polymers, such as nylon and polyester. Also useful are ethylene ionomers (such as ethylene acrylic acid and various metal counter ions), ethylene acrylate copolymers, and ethylene vinyl acetate copolymers. Useful adhesive compositions can be prepared as described, for example, in WO 96/34736 or U.S. Pat. No. 6,402,867, incorporated herein by reference in their entirety.

The compositions of the present invention and layered structures formed using such compositions can be used in tire applications; tire curing bladders; air sleeves, such as air shock absorbers, diaphragms; and hose applications, including gas and fluid transporting hoses. The compositions and hydrophobic layers) comprising such compositions and constructions are particularly useful in pneumatic tires to resist moisture vapor transmission, to improve air holding qualities of the overall tire innerliner construction and to improve the stability of the resulting multilayer tire construction. An especially useful construction is one in which a hydrophobic film layer is joined to the tire innerliner layer and the hydrophobic layer forms the innermost surface of the tire and the opposite innerliner layer surface is in contact with and adhered to the inner surface of the tire carcass. Alternatively, where a second hydrophobic layer is used on the opposite innerliner surface layer an adhesive layer can be used between that second hydrophobic layer and the inner tire carcass layer in order to further enhance adhesion of these two dissimilar components. As is well known, the carcass layer typically comprises reinforcing tire cords. As discussed in detail above, the innerliner layer exhibits advantageously low permeability properties and preferably comprises a dynamically vulcanized composition comprising an engineering resin, particularly polyamide, and a halogenated isobutylene-paramethyl styrene copolymer. Furthermore, as a consequence of the unique physical properties of the hydrophobic layer, it can be a very thin layer, thereby resulting in an overall structure for a tire construction (as well as other constructions comprising an air or fluid holding layer and hydrophobic layer) having reduced weight. Such weight savings, particularly in a tire construction or a hose of significant length, can be substantial.

Forming a tire is a complex, multi-step process that utilizes several different components or layers. Typically the innerliner layer or "stock" is prepared by calendaring the compounded innerliner rubber composition prepared as described above into a sheet form having a thickness of about 0.5 mm to about 2 mm and cutting the sheet into strips of appropriate width and length for innerliner application in a particular size or type tire. The innerliner is then ready for use as an element in the construction of a pneumatic tire. The pneumatic tire is comprised of a multilayered laminate comprising an outer surface which includes the tread and sidewall elements, an intermediate carcass layer which comprises a number of plies containing tire reinforcing fibers, (e.g., rayon, polyester, nylon or metal fibers) embedded in a rubbery matrix, and an innerliner layer which is laminated to the inner surface of the carcass layer. Tires are normally built on a tire forming drum using the layers described above. After the uncured tire has been built on the drum, it is removed and placed in a heated mold. The mold contains an inflatable tire shaping bladder that is situated within the inner circumference of the uncured tire. After the mold is closed the bladder is inflated and it shapes the tire by forcing it against the inner surfaces of the closed mold during the early stages of the curing process. The heat within the bladder and mold raises the temperature of the tire to vulcanization temperatures. Vulcanization temperatures are typically about 100° C. to about 250° C.; preferably about 150° C. to about 200° C. Cure time may vary from about one minute to several hours; preferably from about 5 to 30 minutes. Cure time and temperature depend on many variables well known in the art, including the composition of the tire components, including the cure systems in each of the layers, the overall tire size and thickness, etc. Vulcanization parameters can be established with the assistance of various well-known laboratory test methods, including the test procedure described in ASTM D 2084 (Standard Test Method for Rubber Property-Vulcanization Using Oscillating Disk Cure Meter) as well as stress-strain testing, adhesion testing, flex testing, etc. Vulcanization of the assembled tire results in complete or substantially complete vulcanization or crosslinking of all elements or layers of the tire assembly, i.e., the innerliner, the carcass and the outer tread and sidewall layers. In addition to developing the desired strength characteristics of each layer and the overall structure, vulcanization enhances adhesion between these elements, resulting in a cured, unitary tire from what were separate, multiple layers.

Figure 1A:
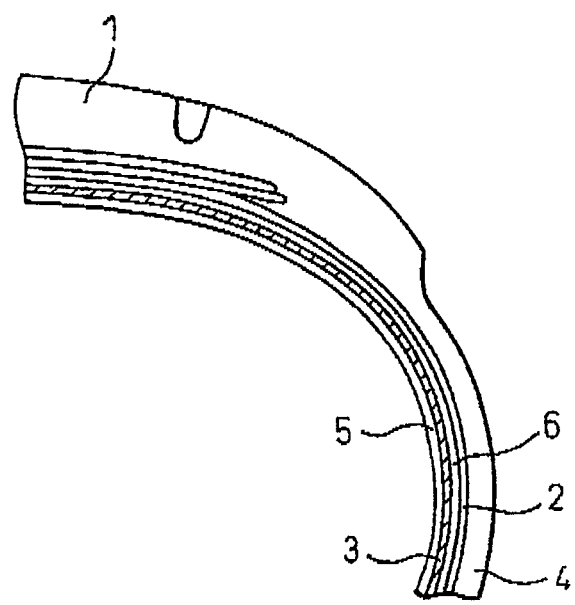
FIG. 1a is a simplified cross-sectional view of a tire showing the location of various layers in a tire including a carcass layer, innerliner layer, a substantially hydrophobic or moisture vapor transmission resistant layer and an adhesive layer between the latter layer and carcass layer.

FIG. 1 is a partial cross-sectional view along the meridian direction of a tire illustrating a typical example of the arrangement of an air permeation prevention or innerliner layer of a pneumatic tire and a substantially hydrophobic thermoplastic layer. In FIG. 1, a portion of the tread is indicated at 1, a carcass layer 2 is indicated at 2 and the tire sidewall is indicated at 4. On the tire inner surface, inside of the carcass layer 2 there is provided an innerliner layer 3. On the innermost surface of the innerliner layer is the substantially hydrophobic thermoplastic layer 5 of the present invention. FIG. 1a illustrates the same construction as shown in FIG. 1 except that an adhesive layer 6 is included between layer 3, the innerliner, and layer 2, the carcass.

Figure 2:
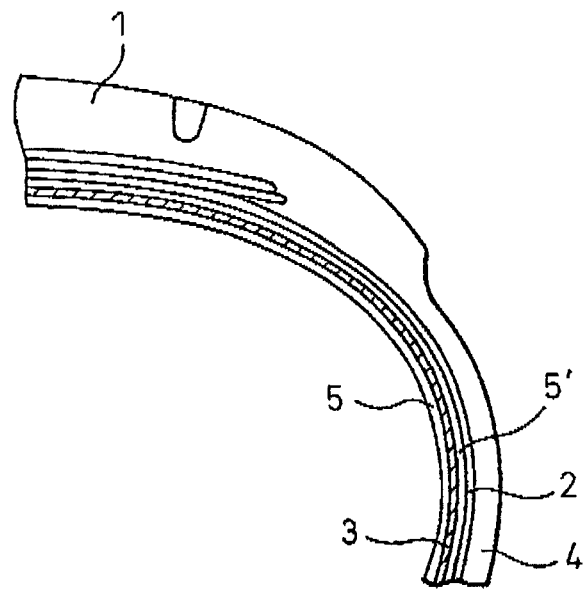
FIG. 2 is a simplified cross-sectional view of a tire showing the location of various layers in a tire including two substantially hydrophobic or moisture vapor transmission resistant layers.
Figure 2A:
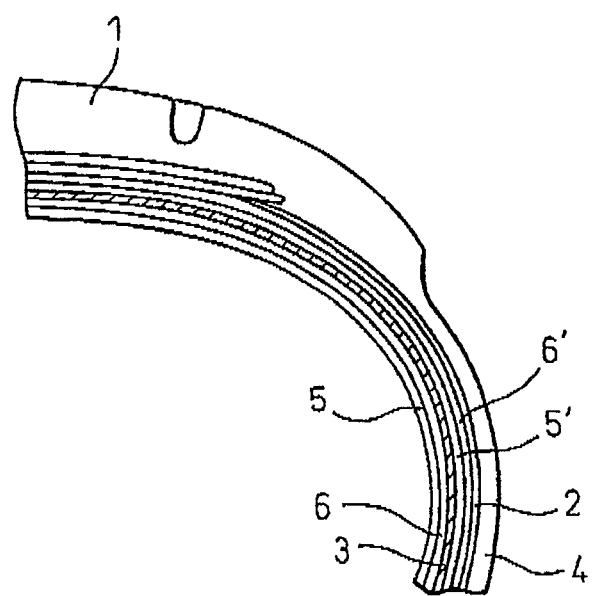
FIG. 2a is a simplified cross-sectional view of a tire showing the location of various layers in a tire including two substantially hydrophobic or moisture vapor transmission resistant layers and an adhesive layer between each of the substantially hydrophobic layers and the surface of the next adjoining layer in which it is in laminated contact.
Figure 2B:
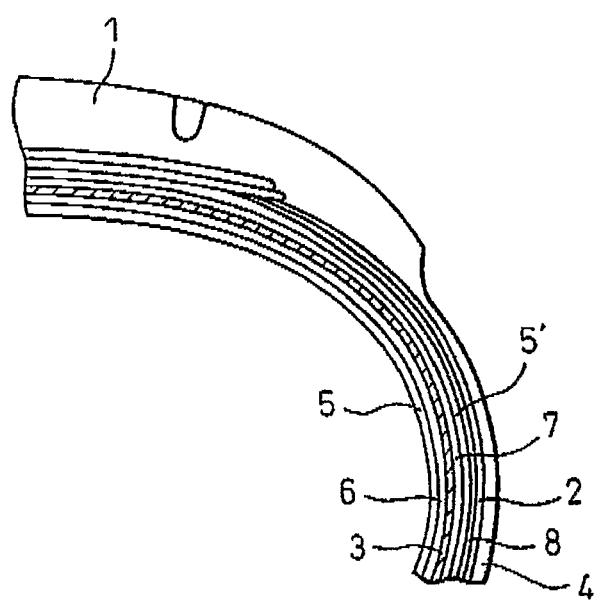
FIG. 2b is a simplified cross-sectional view of a tire showing the location of various layers in a tire including two substantially hydrophobic or moisture vapor transmission resistant layers and an adhesive layer between each of the substantially hydrophobic layers and the surface of the next adjoining layer in which it is in laminated contact as well as a further adhesive layer such that both sides of the thermoplastic layer between the carcass and innerliner includes an adhesive layer.

FIG. 2 is a similar partial cross-sectional view along the meridian direction of a tire illustrating a typical example of the arrangement of an air permeation prevention or innerliner layer of a pneumatic tire, further illustrating an alternative embodiment of the present invention. In FIG. 2, the tread portion 1, carcass layer 2 and sidewall 4 are as illustrated in FIG. 1. Once again on the tire inner surface, inside of the carcass layer 2 there is provided an innerliner layer 3. On the innermost surface of the innerliner layer as well as on the opposite surface of the innerliner layer are substantially hydrophobic thermoplastic layers 5 and 5' of the present invention. FIG. 2a illustrates incorporation of optional adhesive layer 6 between layer 5 and layer 3 as well as optional adhesive layer 6' between layer 5' and layer 2 (carcass); As illustrated in the further alternative embodiment, FIG. 2b, adhesive layer 6 is included between layer 5 and layer 3, adhesive layer 7 is included between layer 5' and layer 3, and adhesive layer 8 is included between layer 5' and layer 2. In other words, an adhesive layer is included on both surfaces of substantially hydrophobic layer 5' so that it is well bonded to both of the surfaces that it contacts, innerliner layer 3 and the carcass layer 2.

As used throughout the specification and claims, including the described embodiments, the singular forms "a," an," and "the" include plural referents unless the context clearly dictates otherwise. Thus, for example, reference to "a thermoplastic polymer for use in the hydrophobic layer" includes a single thermoplastic as well a two or more different thermoplastics in combination or admixture, and the like.

In the specification and claims the term "about" when used as a modifier for, or in conjunction with, a variable, characteristic or condition is intended to convey that the numbers, ranges, characteristics and conditions disclosed herein are flexible and that practice of the present invention by those skilled in the art using temperatures, concentrations, amounts, contents, carbon numbers, properties such as purity, particle size, surface area, bulk density, etc., that are outside of the range or different from a single value, will achieve the desired result, namely, a multilayer construction comprising a hydrophobic layer, where such multilayer construction is suitable for use in an article of manufacture useful for containing a fluid, including, for example, a pneumatic tire, a hose, etc.

The following examples are provided as specific illustrations of embodiments of the claimed invention. It should be understood, however, that the invention is not limited to the specific details set forth in the examples. All parts and percentages in the examples, as well as in the specification, are by weight unless otherwise specified. Any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed.

Various aspects or embodiments of the present invention are set forth in the following enumerated paragraphs:

1. A layered construction comprising at least three layers, one of which layers comprising:
    1) a fluid permeation prevention layer having an upper and a lower surface;
    2) at least one thermoplastic layer in laminate relation with the fluid permeation prevention layer lower surface, said thermoplastic layer comprising a film-forming semi-crystalline carbon chain polymer having a glass transition temperature, Tg, of less than about −20° C.; and
    3) a layer comprising at least one high diene rubber, wherein said fluid permeation prevention layer comprises a polymer composition having an air permeation coefficient of $25 \times 10^{-12}$ cc·cm/cm² sec cmHg (at 30° C.) or less and a Young's modulus of 1 to 500 MPa, where said polymer composition comprises:
    (A) at least 10% by weight, based on the total weight of the polymer composition, of at least one thermoplastic resin component having an air permeation coefficient of $25 \times 10^{-12}$ cc·cm/cm² sec cmHg (at 30° C.) or less and a Young's modulus of more than 500 MPa, which resin component is an engineering resin and or is selected from the group consisting of polyamide resins, polyester resins, polynitrile resins, polymethacrylate resins, polyvinyl resins, cellulose resins, fluororesins, and imide resins, and
    (B) at least 10% by weight, based on the total weight of the polymer composition, of at least one elastomer component having an air permeation Coefficient of more than $25 \times 10^{-12}$ cc·cm/cm² sec cmHg (at 30° C.) and a Young's modulus of not more than 500 MPa, which elastomer component is selected from the group consisting of diene rubbers and the hydrogenates thereof, halogen-containing rubbers, silicone rubbers, sulfur-containing rubbers, fluoro-rubbers, hydrin rubbers, acryl rubbers, ionomers and thermoplastic elastomers, the total amount (A)+(B) of the component (A) and the component (B) being not less than 30% by weight based on the total weight of the polymer composition, wherein the elastomer component (B) is dispersed in a vulcanized state, as a discontinuous phase, in a matrix of the thermoplastic resin component (A) in the polymer composition.

2. The construction of paragraph 1 wherein said thermoplastic polymer has an equilibrium water content at 100% relative humidity of less than about 0.1 g per 100 g polymer or a molar water content per polymer structural unit of less than about 0.1.

3. The construction of paragraph 1 or 2 further comprising a second thermoplastic layer, the thermoplastic of said second thermoplastic layer being the same or different from said first thermoplastic layer and wherein said second thermoplastic layer is in laminate relation with the other of said upper and lower surfaces of said fluid permeation prevention layer.

4. The construction of paragraph 1, 2 or 3 wherein: (1) when said construction comprises one thermoplastic layer, said surface of said fluid permeation prevention layer not in contact with said thermoplastic layer further comprises an adhesive composition; and (2) when said construction comprises two thermoplastic layers each having surfaces, a surface of one of said thermoplastic layers not in contact with said fluid permeation prevention layer is in contact with or further comprises an adhesive composition or adhesive layer.

5. The construction of paragraph 4 wherein said adhesive composition provides an adhesion level to a substrate sufficient to permit the combination of said construction and said substrate to suitably function.

6. The construction of paragraph 5 wherein said functional adhesion is obtained as a consequence of vulcanization of the adhesive composition.

7. The construction of paragraph 4 or 5 wherein said adhesive composition comprises epoxidized styrene-butadiene-styrene block copolymer.

8. The construction of any of paragraphs 1 to 7 wherein said thermoplastic layer comprises a polymer selected from the group consisting of homopolymers and copolymers of polyolefins, styrenics, vinyls, acrylics, fluorocarbons, diene polymers and mixtures thereof.

9. The construction of any of paragraphs 1 to 8 wherein said at least one filler is selected from the group consisting of carbon black, clay, exfoliating clay, calcium carbonate, mica, silica, silicates, talc, titanium dioxide, wood flour and mixtures thereof.

10. The construction of paragraph 9 wherein said at least one filler is selected from the group consisting of carbon black, exfoliating clay and mixtures thereof.

11. The construction of any of paragraphs 1 to 10 wherein said at least one cure system comprises at least one curing agent and at least one accelerator.

12. The construction of any of paragraphs 1 to 11 wherein said fluid permeation prevention layer further comprises an additive selected from the group consisting of pigments, plasticizers, reactive softeners, antioxidants, antiozonants, processing aids, tackifiers, and mixtures thereof, 13. The construction of any of paragraphs 1 to 12 suitable for use in a tire wherein said layer comprising at least one engineering resin is an innerliner layer and said layer comprising said high diene rubber is a carcass layer or sidewall layer or both.

14. The construction of any of paragraphs 1 to 13 wherein the thermoplastic resin component is selected from the group consisting of polyamide resins, polyester resins, polynitrile resins, polymethacrylate resins, polyvinyl resins, cellulose resins, fluororesins, imide resins and mixtures thereof.

15. The construction of paragraph 1 to 13 wherein the thermoplastic resin component is an engineering resin selected from the group consisting of nylon 6, nylon 66, nylon 46, nylon 11, nylon 12, nylon 610, nylon 612, nylon 6/66 copolymer, nylon 6/66/610 copolymer, nylon MXD6, nylon 6T, nylon 6/6T copolymer, nylon 66/PP copolymer, nylon 66/PPS copolymer, polybutylene terephthalate, polyethylene terephthalate, polyethylene isophthalate, polyethylene terephthalate/polyethylene isophthalate copolymer, polyacrylate, polybutylene naphthalate, liquid crystal polyester, polyoxyalkylene diimidate/polybutyrate terephthalate copolymer, polyacrylonitrile, polymethacrylonitrile, acrylonitrile/styrene copolymer, methacrylonitrile/styrene copolymer, methacrylonitrile/styrene/butadiene copolymer, polymethyl methacrylate, polyethyl methacrylate, ethylene vinyl acetate, polyvinyl alcohol, vinyl alcohol/ethylene copolymer, polyvinylidene chloride, polyvinyl chloride, vinyl chloride/vinylidene chloride copolymer, vinylidene chloride/methylacrylate copolymer, cellulose acetate, cellulose acetate butyrate, polyvinylidene fluoride, polyvinyl fluoride, polychlorofluoroethylene, tetrafluoroethylene/ethylene copolymer, aromatic polyimides, and mixtures thereof.

16. The construction of any of paragraphs 1 to 15 wherein said at least one elastomer component B is selected from the group consisting of natural rubber, synthetic polyisoprene rubber, epoxylated natural rubber, styrene-butadiene rubber (SBR), polybutadiene rubber (BR), nitrile-butadiene rubber (NBR), hydrogenated NBR, hydrogenated SBR; ethylene propylene diene monomer rubber (EPDM), ethylene propylene rubber (EPM), maleic acid-modified ethylene propylene rubber (M-EPM), butyl rubber (IIR), isobutylene-aromatic vinyl or diene monomer copolymers, brominated-IIR, chlorinated-IIR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

17. The construction of any of paragraphs 1 to 16 wherein said at least one elastomer component B is selected from the group consisting of a halide of a $C_4$ to $C_7$ isomonoolefin and p-alkylstyrene copolymer, brominated isobutylene p-methylstyrene copolymer, hydrogenated nitrile-butadiene rubber, acrylonitrile butadiene rubber, chlorosulfonated polyethylene, chlorinated polyethylene, epichlorohydrin rubber, chlorinated butyl rubber, and brominated butyl rubber.

18. The construction of any of paragraphs 1 to 17 wherein said elastomer component of said fluid permeation prevention layer is substantially fully vulcanized.

19. The construction of paragraph 8 wherein said thermoplastic is selected from the group consisting of ethylene homopolymers, ethylene copolymers, low density polyethylene, linear low density polyethylene, high density polyethylene, ethylene-styrene copolymer, ethylene-propylene copolymer, ethylene-butene copolymer, ethylene-hexene copolymer, ethylene-octene copolymer and mixtures thereof.

20. The construction of any of paragraphs 2 to 19 wherein said thermoplastic polymer exhibits a glass transition temperature, Tg, of less than about −20° C.

21. The construction of any of paragraphs 1 to 20 further comprising an adhesive layer or adhesive composition between said thermoplastic layer and said fluid permeation prevention layer.

22. An article comprising:
(A) a first layer comprising an elastomer;
(B) a second layer comprising a dynamically vulcanized alloy of an engineering resin and a copolymer of an isoolefin and a para-alkylstyrene, said second layer having fluid permeation prevention properties; and
(C) a substantially hydrophobic thermoplastic layer having an upper and a lower surface and comprising a film-forming, semi-crystalline, substantially hydrophobic carbon chain polymer having a glass transition temperature, Tg, of less than about −20° C.;
wherein said upper or said lower surface of said second layer is adjacent said first layer, and the other of said upper or said lower surface of said thermoplastic layer is adjacent a fluid.

23. The article of paragraph 22 wherein said engineering resin is selected from the group consisting of polyamide resins, polyester resins, polynitrile resins, poly(meth)acrylate resins, polyvinyl resins, cellulose resins, fluorine resins, imide resins and mixtures thereof.

24. The article of paragraph 22 or 23 wherein said first layer elastomer is selected from the group consisting of at least one halogenated elastomer and at least one high diene rubber.

25. The article of paragraph 24 wherein said first layer elastomer is selected from the group consisting of a halogen-containing random copolymer of a $C_4$ to $C_7$ isomonoolefin and a para-alkylstyrene, said para-alkylstyrene comprising about 0.5 weight percent to about 20 weight percent of said copolymer, a halogen-containing random copolymer of a $C_4$ to $C_{12}$ isomonoolefin and a $C_4$ to $C_{14}$ multiolefin, said halogen selected from the group consisting of chlorine, bromine and mixtures thereof; a natural or synthetic rubber comprising at least 50 mole % of diene monomer and selected from the group consisting of polyisoprene, polybutadiene, poly(styrene-co-butadiene), poly(styrene-butadiene-styrene) block copolymer, natural rubber; and mixtures thereof.

26. The article of paragraph 23 wherein said engineering resin is selected from the group consisting of nylon 6, nylon 66, nylon 46, nylon 11, nylon 12, nylon 610, nylon 612, nylon 6/66 copolymer, nylon 6/66/610 copolymer, nylon MXD6, nylon 6T, nylon 6/6T copolymer, nylon 66/PP copolymer, nylon 66/PPS copolymer, polybutylene terephthalate, polyethylene terephthalate, polyethylene isophthalate, polyethylene terephthalate/polyethylene isophthalate copolymer, polyacrylate, polybutylene naphthalate, liquid crystal polyester, polyoxyalkylene diimide diacid/polybutyrate terephthalate copolymer, polyacrylonitrile, polymethacrylonitrile, acrylonitrile/styrene copolymer, methacrylonitrile/styrene copolymer, methacrylonitrile/styrene/butadiene copolymer, polymethyl methacrylate, polyethyl methacrylate, ethylene vinyl acetate, polyvinyl alcohol, vinyl alcohol/ethylene copolymer, polyvinylidene chloride, polyvinyl chloride, polyvinyl/polyvinylidene copolymer, vinylidene chloride/methylacrylate copolymer, cellulose acetate, cellulose acetate butyrate, polyvinylidene fluoride, polyvinyl fluoride, polychlorofluoroethylene, tetrafluoroethylene/ethylene copolymer, aromatic polyimides, and mixtures thereof.

27. The article of any of paragraphs 22 to 26 wherein said thermoplastic polymer has an equilibrium water content at 100% relative humidity of less than about 0.1 g per 100 g polymer or a molar water content per polymer structural unit of less than about 0.1.

28. The article of any of paragraphs 22 to 27 wherein said thermoplastic layer comprises a polymer selected from the group consisting of homopolymers and copolymers of polyolefins, ethylene homopolymers, ethylene copolymers, styrenics, vinyls, acrylics, fluorocarbons, diene polymers and mixtures thereof.

29. The article of paragraph 28 wherein said thermoplastic layer comprises low density polyethylene.

30. The article of any of paragraphs 22 to 29 further comprising an adhesive composition or adhesive layer situated between said substantially hydrophobic thermoplastic layer and said fluid permeation prevention layer.

31. The article of paragraph 30 wherein said adhesive composition or adhesive layer comprises at least one polymer or copolymer selected from the group consisting of maleated ethylene copolymers, epoxidized ethylene copolymers, ethylene ionomers, ethylene acrylate copolymers, ethylene vinyl acetate copolymers and mixtures thereof.

32. The article of paragraph 30 wherein said adhesive layer or adhesive composition is about 1 micron to about 15 microns thick.

33. The article of any of paragraphs 22 to 32 further comprising a second substantially hydrophobic thermoplastic layer between said fluid permeation prevention layer and said first elastomer containing layer.

34. The article of paragraph 33 further comprising an adhesive composition or adhesive layer situated between said substantially hydrophobic thermoplastic layer and said first elastomer containing layer.

35. The article of any of paragraphs 22 to 34 substantially in the form of a hose.

36. A pneumatic tire comprising an inner air chamber and an outer tread and sidewall portion, an inner carcass portion having a top surface adhered or bonded to said tread and sidewall portion and a bottom surface, a laminated innerliner layer having a top surface and a bottom surface, wherein the top surface of said innerliner layer is adhered or bonded to the bottom surface of said carcass layer and the bottom surface of said innerliner layer being the innermost surface in contact with the air present in said air chamber, said innerliner layer comprising an engineering resin and at least one thermoplastic layer in laminate relation with at least said bottom innerliner surface, said thermoplastic layer comprising a film-forming, semi-crystalline, substantially hydrophobic carbon chain polymer having a glass transition temperature, Tg, of less than about −20° C.

37. The pneumatic tire of paragraph 36 wherein said innerliner layer comprises a dynamically vulcanized alloy of an engineering resin and a halogen-containing random elastomeric copolymer of a $C_4$ to $C_7$ isomonoolefin and a para-alkylstyrene, said para-alkylstyrene comprising about 0.5 to about 20 weight percent of said copolymer, wherein said elastomeric copolymer is dispersed in a vulcanized state, as a discontinuous phase, in a matrix of said engineering resin.

38. The pneumatic tire of paragraph 36 wherein said innerliner layer comprises a dynamically vulcanized alloy of an engineering resin and a halogen-containing random elastomeric copolymer of a $C_4$ to $C_{12}$ isomonoolefin and a $C_4$ to $C_{14}$ multiolefin, wherein said elastomeric copolymer is dispersed in a vulcanized state, as a discontinuous phase, in a matrix of said engineering resin.

39. The pneumatic tire of paragraph 37 wherein said tire is vulcanized.

40. A method for fabricating a pneumatic tire comprising a carcass element containing a high diene rubber and an innerliner layer as the innermost layer of said tire, comprising the steps of:
(A) providing an innerliner layer comprising a substantially vulcanized halogenated isomonoolefin-containing elastomer dispersed in particulate form in an engineering resin, said innerliner layer having an upper and a lower surface;
(B) providing a first thermoplastic layer in laminate relation with at least said lower surface of said innerliner layer, said thermoplastic layer comprising a film-forming, semi-crystalline, substantially hydrophobic carbon chain polymer having a glass transition temperature, Tg, of less than about −20° C.;
(C) contacting the upper surface of said innerliner layer with said carcass element to form a further laminated structure; and
(D) heating and forming said laminated structure under pressure to the desired shape of a tire at a temperature of from about 100° C. to about 250° C. for a period of time sufficient to substantially vulcanize said structure.

41. The method of paragraph 40 further comprising a second thermoplastic layer in laminate relation with said upper surface of said innerliner layer, said second thermoplastic layer comprising a film-forming, semi-crystalline, substantially hydrophobic carbon chain polymer having a glass transition temperature, Tg, of less than about −20° C.; wherein said first thermoplastic layer, said second thermoplastic layer or both are in contact with an adhesive composition or adhesive layer between said thermoplastic layer and said fluid permeation prevention layer, between said thermoplastic layer and said carcass or both.

42. The method of paragraph 41 wherein said adhesive layer comprises epoxidized styrenic block copolymer.

43. The tire of paragraph 36 selected from the group consisting of tires suitable for use on automobiles, trucks, construction vehicles, recreational vehicles and farm vehicles.

44. A pneumatic tire comprising an outer tread layer, intermediate sidewall and carcass layers and an innermost air permeation prevention layer:
(i) said air permeation prevention layer having an upper and a lower surface, said layer comprising a polymer composition having an air permeation coefficient of about $25 \times 10^{-12}$ cc cm/cm² sec cmHg (at 30° C.) or less and a Young's modulus of about 1 MPa to about 500 MPa, said polymer composition comprising:

(A) at least 10% by weight, based on the total weight of the polymer composition, of at least one thermoplastic resin component having an air permeation coefficient of about $25 \times 10^{-12}$ cc cm/cm² sec cmHg (at 30° C.) or less and a Young's modulus of more than 500 MPa, which resin component is selected from the group consisting of polyamide resins, polyester resins, polynitrile resins, polymethacrylate resins, polyvinyl resins, cellulose resins, fluororesins, and imide resins, and (B) at least 10% by weight, based on the total weight of said polymer composition, of at least one elastomer component having an air permeation coefficient of more than about $25 \times 10^{-12}$ cc cm/cm² sec cmHg (at 30° C.) and a Young's modulus of not more than 500 MPa, which elastomer component is selected from the group consisting of diene rubbers and the hydrogenates thereof, halogen-containing rubbers, silicone rubbers, sulfur-containing rubbers, fluoro-rubbers, hydrin rubbers, acryl rubbers, ionomers and thermoplastic elastomers, the total amount (A)+(B) of the component (A) and the component (B) being not less than about 30% by weight based on the total weight of said polymer composition, wherein the elastomer component (B) is dispersed in a vulcanized state, as a discontinuous phase, in a matrix of the thermoplastic resin component (A) in said polymer composition; and (ii) at least one thermoplastic layer in laminate relation with at least said lower surface of said air permeation prevention layer, said thermoplastic layer comprising a film-forming, semi-crystalline, substantially hydrophobic carbon chain polymer having a glass transition temperature, Tg, of less than about −20° C.

45. A pneumatic tire as claimed in paragraph 44, further comprising an adhesive composition or adhesive layer between said thermoplastic layer and said fluid permeation prevention layer.

46. A pneumatic tire as claimed in paragraph 44 or 45, further comprising a thermoplastic layer in laminate relation with at said upper surface of said innerliner layer, said thermoplastic layer comprising a film-forming, semi-crystalline, substantially hydrophobic carbon chain polymer having a glass transition temperature, Tg, of less than about −20° C. and further comprising an adhesive layer between the thermoplastic layer laminated to the upper surface of said innerliner layer and said carcass layer.

47. The pneumatic tire of paragraph 46 wherein said adhesive layer comprises epoxidized styrenic block copolymer.

48. A pneumatic tire as described in paragraph 44 wherein said component (i) (A) is at least one polyamide resin, and said component (i) (B) is at least one bromine-containing random elastomeric copolymer of a $C_4$ to $C_7$ isomonoolefin and a para-alkylstyrene.

49. A pneumatic tire as described in paragraph 45, wherein said adhesive layer comprises at least one polymer selected from the group consisting of ethylene acrylic ester terpolymers comprising at least one of methyl-acrylate, ethyl-acrylate or butyl-acrylate; and at least one of maleic anhydride or glycidyl methacrylate.

50. A vulcanizable layered construction comprising at least two elastomer-containing layers and at least one thermoplastic film layer, the first of said two elastomer-containing layers characterized as a fluid permeation prevention layer, the second of said at least two elastomer-containing layers comprising at least one high diene rubber; said thermoplastic film layer comprising at least one thermoplastic, film-forming, semi-crystalline, substantially hydrophobic carbon chain polymer having a glass transition temperature, Tg, of less than about −20° C.;

wherein said layers are arranged in an order selected from the following: (1) said at least one thermoplastic film layer, said fluid permeation prevention layer and said high diene rubber containing layer; or (2) said fluid permeation prevention layer, said high diene rubber containing layer, and said at least one thermoplastic film layer, and said fluid permeation prevention layer comprises a composition having a Young's modulus of about 1 MPa to about 500 MPa said composition comprising:

(A) at least 10% by weight, based on the total weight of the polymer composition, of at least one thermoplastic resin component having a Young's modulus of more than 500 MPa, which resin component is selected from the group consisting of polyamide resins, polyester resins, polynitrile resins, polymethacrylate resins, polyvinyl resins, cellulose resins, fluororesins, and imide resins, and (B) at least 10% by weight, based on the total weight of the polymer composition, of at least one elastomer component having a Young's modulus of not more than 500 MPa, which elastomer component is selected from the group consisting of diene rubbers and the hydrogenates thereof, halogen-containing rubbers, silicone rubbers, sulfur-containing rubbers, fluoro-rubbers, hydrin rubbers, acryl rubbers, ionomers and thermoplastic elastomers, the total amount (A)+(B) of the component (A) and the component (B) being not less than about 30% by weight based on the total weight of the polymer composition, wherein said elastomer component (B) is dispersed in a substantially vulcanized state, as a discontinuous phase, in a matrix of the thermoplastic resin component (A) in the polymer composition.

51. The construction of paragraph 50, said layers arranged in the order (1) and further comprising a second thermoplastic film layer, said second thermoplastic film layer between said fluid permeation prevention layer and said high diene rubber-containing layer, said second thermoplastic film layer comprising a film-forming, semi-crystalline, substantially hydrophobic carbon chain polymer having a glass transition temperature, Tg, of less than about −20° C.

52. The construction of paragraph 51 further comprising at least one adhesive layer between (1) said thermoplastic film layer and said fluid permeation prevention layer, (2) between said second thermoplastic film layer and said high diene rubber-containing layer or between both (1) and (2).

53. The construction of paragraph 50, 51, or 52 further comprising an additive selected from the group consisting of pigments, antioxidants, antiozonants, processing aids, tackifiers, and mixtures thereof.

54. The construction of any of paragraphs 50 to 53 suitable for use in a tire wherein said layer comprising at least one engineering resin is a tire innerliner layer and said layer comprising said high diene rubber is a tire carcass layer or tire sidewall layer or both.

55. The construction of any of paragraphs 50 to 54 wherein said engineering resin is selected from the group consisting of polyamide resins, polyester resins, polynitrile resins, polymethacrylate resins, polyvinyl resins, cellulose resins, fluororesins, imide resins and mixtures thereof.

56. The construction of any of paragraphs 50 to 54 wherein said engineering resin is selected from the group consisting of nylon 6, nylon 66, nylon 46, nylon 11, nylon 12, nylon 610, nylon 612, nylon 6/66 copolymer, nylon 6/66/610 copolymer, nylon MXD6, nylon 6T, nylon 6/6T copolymer, nylon 66/PP copolymer, nylon 66/PPS copolymer, polybutylene terephthalate, polyethylene terephthalate, polyethylene isophthalate, polyethylene terephthalate/polyethylene isophthalate copolymer, polyacrylate, polybutylene naphthalate, liquid crystal polyester, polyoxyalkylene diimidate/polybutyrate terephthalate copolymer, polyacrylonitrile, polymethacrylonitrile, acrylonitrile/styrene copolymer, methacrylonitrile/styrene copolymer, methacrylonitrile/styrene/butadiene copolymer, polymethyl methacrylate, polyethyl methacrylate, ethylene vinyl acetate, polyvinyl alcohol, vinyl alcohol/ethylene copolymer, polyvinylidene chloride, polyvinyl chloride, vinyl chloride/vinylidene chloride copolymer, vinylidene chloride/methylacrylate copolymer, cellulose acetate, cellulose acetate butyrate, polyvinylidene fluoride, polyvinyl fluoride, polychlorofluoroethylene, tetrafluoroethylene/ethylene copolymer, aromatic polyimides, and mixtures thereof.

57. The construction of any of paragraphs 50 to 56 wherein said at least one elastomer component B is selected from the group consisting of natural rubber, synthetic polyisoprene rubber, epoxylated natural rubber, styrene-butadiene rubber (SBR), polybutadiene rubber (BR), nitrile-butadiene rubber (NBR), hydrogenated NBR, hydrogenated SBR; ethylene propylene diene monomer rubber (EPDM), ethylene propylene rubber (EPM), maleic acid-modified ethylene propylene rubber (M-EPM), butyl rubber (IIR), isobutylene-aromatic vinyl or diene monomer copolymers, brominated-IIR, chlorinated-IIR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

58. The construction of any of paragraphs 50 to 57 wherein said at least one elastomer component B is selected from the group consisting of a halide of a $C_4$ to $C_7$ isomonoolefin and p-alkylstyrene copolymer, brominated isobutylene p-methylstyrene copolymer, hydrogenated nitrile-butadiene rubber, acrylonitrile butadiene rubber, chlorosulfonated polyethylene, chlorinated polyethylene, epichlorohydrin rubber, chlorinated butyl rubber, and brominated butyl rubber.

59. The construction of any of paragraphs 50 to 58 wherein said elastomer component of said fluid permeation prevention layer is substantially fully vulcanized.

60. The vulcanized construction of any of paragraphs 50 to 59.

61. An article comprising the vulcanizable construction of any of paragraphs 50 to 60.

62. The article of paragraph 61 selected from the group consisting of hoses and pneumatic tire components.

63. A pneumatic tire comprising an outer tread layer, intermediate sidewall and carcass layers and an innermost air permeation prevention layer:

(i) said air permeation prevention layer having an upper and a lower surface, said layer comprising a polymer composition having an air permeation coefficient of about $25 \times 10^{-12}$ cc cm/cm² sec cmHg (at 30° C.) or less and a Young's modulus of about 1 MPa to about 500 MPa, said polymer composition comprising:

(A) at least 10% by weight, based on the total weight of the polymer composition, of at least one thermoplastic resin component having an air permeation coefficient of about $25 \times 10^{-12}$ cc cm/cm² sec cmHg (at 30° C.) or less and a Young's modulus of more than 500 MPa, which resin component is selected from the group consisting of polyamide resins, polyester resins, polynitrile resins, polymethacrylate resins, polyvinyl resins, cellulose resins, fluororesins, and imide resins, and (B) at least 10% by weight, based on the total weight of said polymer composition, of at least one elastomer component having an air permeation coefficient of more than about $25 \times 10^{-12}$ cc cm/cm² sec cmHg (at 30° C.) and a Young's modulus of not more than 500 MPa, which elastomer component is selected from the group consisting of diene rubbers and the hydrogenates thereof, halogen-containing rubbers, silicone rubbers, sulfur-containing rubbers, fluoro-rubbers, hydrin rubbers, acryl rubbers, ionomers and thermoplastic elastomers, the total amount (A)+(B) of the component (A) and the component (B) being not less than about 30% by weight based on the total weight of said polymer composition, wherein the elastomer component (B) is dispersed in a vulcanized state, as a discontinuous phase, in a matrix of the thermoplastic resin component (A) in said polymer composition; and (ii) at least one thermoplastic layer in laminate relation with at least said lower surface of said air permeation prevention layer, said thermoplastic layer comprising a film-forming, semi-crystalline, substantially hydrophobic carbon chain polymer having a glass transition temperature, Tg, of less than about −20° C.

Examples

Compositions were prepared according to the following examples. The amount of each component used is based on parts per hundred rubber (phr) present in the composition. The following commercially available products were used for the components employed in the compositions of the examples:

| Fluid Permeation Prevention Resin Components | Description |
|---|---|
| N11 (Nylon 11) | Rilsan BMN O (Atochem) |
| N6/66 (Nylon 6/66 copolymer) | Ube 5033B (Ube) |
| P1 | Plasticizer, BM4, N-butylsulfonamide (Daihachi Chemical Ind.) |
| R1 | Reactive softener, AR201, maleated ethylene ethyl acrylate (EEA) copolymer (Mitsui-Dupont) Tg = −35° C. |
| S1 | Stabilizer package includes Irganox, Tinuvin, Copper Iodide (CuI) |

| Rubber Component | Description |
|---|---|
| BIMS | Brominated isobutylene p-methyl styrene copolymer, 0.75% Br, 5% PMS, ExxonMobil Chemical) |

| Cure System Components | Description-Function |
|---|---|
| ZnO | Zinc oxide - cure system component |
| St-acid | Stearic acid - cure system component |
| ZnSt | Zinc sterate - cure system component |

-continued

| Hydrophobic Thermoplastic Components | Description-Function |
|---|---|
| PE-1 | Low density polyethylene (LDPE), LD-150BW (0.75 MI, 0.923 density, 240 MPa modulus, ExxonMobil Chemical) |
| PE-2 | Low density polyethylene (LDPE), Novatec LD LJ603 (7 MFR, 0.917 density, Japan Polyethylene Corp.) |

In accordance with the compositions or formulations listed in Table 1, examples 1 and 2 were prepared using a dynamic vulcanization twin-screw extruder at 220° C. The elastomer component and vulcanization system were charged into a kneader, mixed for about 3.5 minutes and dumped out at a temperature of about 90° C. The mixture was then pelletized using a rubber pelletizer. Premixing of the nylon components with plasticizer and stabilizers was performed using a Japan Steel Works, Ltd. Model 44 (JSW-44) twin screw extruder at 210° C. All of the pre-blended nylon components, including plasticizer and stabilizer, pre-compounded rubber pellets, and reactive softener were then metered into a JSW-44 twin screw extruder at 220° C. for extrusion mixing and dynamic vulcanization. Extrudates were cooled in a water bath, pelletized and dried.

TABLE 1

| Example (phr) | 1 | 2 |
|---|---|---|
| BIMS | 100 | 100 |
| ZnO | 0.15 | 0.15 |
| St-acid | 0.60 | 0.60 |
| ZnSt | 0.30 | 0.30 |
| N11 | 40.4 | 0 |
| N6/66 | 27.8 | 66.5 |
| P1 | 11.0 | 23.4 |
| R1 | 10.1 | 10.0 |
| S1 | 0.51 | 0.50 |
| Permeability* | 20 | 21 |
| M50, RT** | 4.1 | 6.0 |
| EB (%), RT** | 380 | 400 |

*Permeability test: oxygen permeability at 30° C. measured according to JIS K7126 test standard in units of $10^{-12}$ $cm^3$-cm/$cm^2$-sec-cmHg
**M50 = 50% modulus in units of MPa, measured at room temperature (RT) (according to ASTM D412-92); EB = elongation at break measured at room temperature (according to ASTM D412-92).

An A/B/A laminate was prepared where layer A is PE1 and layer B is the composition of Example 1. The laminate was formed using a W&H (Windmoeller & Hoelscher Corp., Lincoln, R.I., USA) co-extrusion blown film line with 250 mm die and three 60/90/60 mm extruders. The line speeds were about 65 kg/h for PE1 and about 70 kg/h for the composition of Example 1 with a blow-up ratio of 2. An A/B laminate was prepared using a Brampton (Brampton Engineering, Brampton, Ontario, CA) co-extrusion blown film line with 100 mm die and two 50/75 mm extruders where A is PE2 and B is the composition of Example 2. The line speed was about 0.5 kg/h for PE2 and 1 kg/h for the composition of Example 2 with a blow-up ratio of 4. The moisture permeability comparison between the composition of Example 1 and PE1/Example 1/PE1 laminate is shown in Table 2 and the comparison between the composition of Example 2 and PE2/Example 2 laminate is shown in Table 3.

TABLE 2

| Example | 1 | 3 |
|---|---|---|
| Material or Laminate | Example 1 | PE1/Example 1/PE1 |
| Thickness (microns) | 100 | 52/106/52 |
| MVTR* | 8 | 2.5 |

MVTR = moisture vapor transmission rate in units of $g/m^2$-day measured at 38° C. using a Permatran-W Model 3/61 tester (Mocon, Inc., Minneapolis, MN)

TABLE 3

| Example | 2 | 4 |
|---|---|---|
| Material or Laminate | Example 2 | PE2/Example 2 |
| Thickness (microns) | 170 | 70/171 |
| MVTR | 16 | 8 |
| E' (−40° C.) | 370 | 280 |
| E' (−20° C.) | 294 | 225 |
| E' (20° C.) | 140 | 192 |

MVTR = moisture vapor transmission rate in $g/m^2$-day measured at 38° C. using a Permatran-W Model 3/61 tester (Mocon, Inc., Minneapolis, MN)
E' = dynamic storage modulus in MPa measured using a Rheometric DMTA, dynamic mechanical thermal analysis, temperature scan at 1 Hz (TA Instruments, Inc., New Castle, DE; formerly Rheometric Scientific).

As shown in Tables 2 and 3, lamination of a polyethylene film, in this examples, LDPE, onto the thermoplastic elastomer composition greatly lowers the moisture transmission rate of the resulting laminate. In addition, using the soft or flexible LDPE layer did not adversely affect the room temperature and low temperature moduli of the thermoplastic elastomer.

All documents described herein are incorporated by reference herein, including any priority documents and/or testing procedures, to the extent they are not inconsistent with this disclosure. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A layered construction comprising at least three layers, one of which layers comprising a fluid permeation prevention layer having an upper and a lower surface; at least one thermoplastic layer in laminate relation with at least said fluid permeation prevention layer lower surface, said thermoplastic layer comprising a film-forming semi-crystalline carbon chain polymer having a glass transition temperature, Tg, of less than about −20° C. and wherein said thermoplastic polymer has an equilibrium water content at 100% relative humidity of less than about 0.1 g per 100 g polymer or a molar water content per polymer structural unit of less than about 0.1; and a layer comprising at least one high diene rubber;
wherein said fluid permeation prevention layer comprises a polymer composition having an air permeation coefficient of $25 \times 10^{-12}$ cc·cm/$cm^2$ sec cmHg (at 30° C.) or less and a Young's modulus of 1 to 500 MPa, said layer of said polymer composition comprising:
(A) at least 10% by weight, based on the total weight of the polymer composition, of at least one thermoplastic resin component having an air permeation coefficient of $25 \times 10^{-12}$ cc·cm/$cm^2$ sec cmHg (at 30° C.) or less and a Young's modulus of more than 500 MPa, which resin component is selected from the group consisting of polyamide resins, polyester resins, polynitrile resins, polymethacrylate resins, polyvinyl resins, cellulose resins, fluororesins, and imide resins, (B) at least 10% by weight, based on the total weight of the polymer composition, of at least one elastomer component having an air permeation coefficient of more than $25 \times 10^{-12}$ cc·cm/cm$^2$ sec cmHg (at 30° C.) and a Young's modulus of not more than 500 MPa, which elastomer component is selected from the group consisting of diene rubbers and the hydrogenates thereof, halogen-containing rubbers, silicone rubbers, sulfur-containing rubbers, fluoro-rubbers, hydrin rubbers, acryl rubbers, ionomers and thermoplastic elastomers, the total amount (A)+(B) of the component (A) and the component (B) being not less than 30% by weight based on the total weight of the polymer composition, wherein the elastomer component (B) is dispersed in a vulcanized state, as a discontinuous phase, in a matrix of the thermoplastic resin component (A) in the polymer composition; and wherein said at least one thermoplastic layer comprises low density polymer of ethylene.

2. The construction of claim 1 further comprising a second thermoplastic layer, the thermoplastic of said second thermoplastic layer being the same or different from said first thermoplastic layer and wherein said second thermoplastic layer is in laminate relation with the other of said upper and lower surfaces of said fluid permeation prevention layer.

3. The construction of claim 1 wherein: (1) when said construction comprises one thermoplastic layer, said surface of said fluid permeation prevention layer not in contact with said thermoplastic layer further comprises an adhesive composition; and (2) when said construction comprises two thermoplastic layers each having surfaces, a surface of one of said thermoplastic layers not in contact with said fluid permeation prevention layer is in contact with or further comprises an adhesive composition or adhesive layer.

4. The construction of claim 1 suitable for use in a tire wherein said layer comprising at least one fluid permeation prevention layer is an innerliner layer and said layer comprising said high diene rubber is a carcass layer or sidewall layer or both.

5. The construction of claim 1 wherein said at least one elastomer component B is selected from the group consisting of natural rubber, synthetic polyisoprene rubber, epoxylated natural rubber, styrene-butadiene rubber (SBR), polybutadiene rubber (BR), nitrile-butadiene rubber (NBR), hydrogenated NBR, hydrogenated SBR; ethylene propylene diene monomer rubber (EPDM), ethylene propylene rubber (EPM), maleic acid-modified ethylene propylene rubber (M-EPM), butyl rubber (IIR), isobutylene-aromatic vinyl or diene monomer copolymers, brominated-IIR, chlorinated-IIR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

6. The construction of claim 1, wherein said layer comprising at least one high diene rubber is located on the upper surface of said fluid permeation prevention layer opposite from said at least one thermoplastic layer.

\* \* \* \* \*